United States Patent
Hibser et al.

(10) Patent No.: US 12,174,745 B2
(45) Date of Patent: *Dec. 24, 2024

(54) DOCUMENT LOCKING AND CACHE MEMORY MANAGEMENT IN CLOUD COMPUTING

(71) Applicant: RELATIVITY ODA LLC, Chicago, IL (US)

(72) Inventors: Jeffrey Hibser, Chicago, IL (US); Mohammad Amer Ghazal, Chicago, IL (US); Steven Engelhardt, Chicago, IL (US); Michael R. Gayeski, Chicago, IL (US); Brandon Michelsen, Chicago, IL (US); Ankit Khandelwal, Chicago, IL (US); Ranga Sankar, Chicago, IL (US); Robert A. Skinner, Chicago, IL (US)

(73) Assignee: RELATIVITY ODA LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/391,059

(22) Filed: Dec. 20, 2023

(65) Prior Publication Data

US 2024/0126700 A1   Apr. 18, 2024

Related U.S. Application Data

(63) Continuation of application No. 17/867,500, filed on Jul. 18, 2022, now Pat. No. 11,899,587.

(Continued)

(51) Int. Cl.
*G06F 3/06* (2006.01)
*G06F 12/08* (2016.01)
(Continued)

(52) U.S. Cl.
CPC ........ *G06F 12/0868* (2013.01); *G06F 3/0604* (2013.01); *G06F 3/0659* (2013.01);
(Continued)

(58) Field of Classification Search
CPC ............ G06F 12/0868; G06F 12/0802; G06F 3/0604; G06F 3/0659; G06F 3/067;
(Continued)

(56) References Cited

U.S. PATENT DOCUMENTS 6,023,726 A   2/2000   Saksena
6,047,356 A   4/2000   Anderson et al.
(Continued)

OTHER PUBLICATIONS

Non-final Office Action, U.S. Appl. No. 17/867,169, mailed Dec. 18, 2023.
(Continued)

*Primary Examiner* — Khoa D Doan
(74) *Attorney, Agent, or Firm* — MARSHALL, GERSTEIN & BORUN LLP; Randall G. Rueth

(57) ABSTRACT

Systems and methods for object-based data storage are provided. There may be a read/write cache configured to cache objects to be written to an object-based data storage. A document in the read/write cache may have a lock state set to unlocked, thereby allowing the document to be deleted. Or, the document in the read/write cache may have a lock state set to locked, thereby preventing deletion of the document.

20 Claims, 9 Drawing Sheets

Related U.S. Application Data

(60) Provisional application No. 63/289,127, filed on Dec. 13, 2021, provisional application No. 63/289,130, filed on Dec. 13, 2021, provisional application No. 63/289,134, filed on Dec. 13, 2021.

(51) Int. Cl.

| | | |
|---|---|---|
| *G06F 12/0802* | (2016.01) | |
| *G06F 12/0868* | (2016.01) | |
| *G06F 16/13* | (2019.01) | |
| *G06F 16/93* | (2019.01) | |

(52) U.S. Cl.
CPC .......... *G06F 3/067* (2013.01); *G06F 12/0802* (2013.01); *G06F 16/13* (2019.01); *G06F 16/93* (2019.01); *G06F 2212/60* (2013.01); *G06F 2212/6042* (2013.01)

(58) Field of Classification Search
CPC .......... G06F 3/061; G06F 16/13; G06F 16/93; G06F 16/16; G06F 16/172; G06F 2212/60; G06F 2212/6042
See application file for complete search history.

(56) References Cited

U.S. PATENT DOCUMENTS

| | | | |
|---|---|---|---|
| 6,055,572 A | 4/2000 | Saksena | |
| 6,058,461 A | 5/2000 | Lewchuk et al. | |
| 6,247,107 B1 | 6/2001 | Christie | |
| 6,330,630 B1 | 12/2001 | Bell | |
| 6,647,453 B1 | 11/2003 | Duncan et al. | |
| 6,993,591 B1 | 1/2006 | Klemm | |
| 7,124,252 B1 | 10/2006 | Khare et al. | |
| 7,363,291 B1 | 4/2008 | Page | |
| 7,383,391 B2 | 6/2008 | Davis et al. | |
| 7,574,538 B1 | 8/2009 | Yochai | |
| 7,747,749 B1 | 6/2010 | Erikson et al. | |
| 7,822,731 B1 | 10/2010 | Yu et al. | |
| 7,975,025 B1 | 7/2011 | Szabo et al. | |
| 8,356,143 B1 | 1/2013 | Bulusu et al. | |
| 8,429,351 B1 | 4/2013 | Yu et al. | |
| 9,372,840 B1 | 6/2016 | Golchha et al. | |
| 9,826,054 B2 | 11/2017 | Gasser et al. | |
| 9,940,241 B1 * | 4/2018 | Mehrotra | G06F 12/0811 |
| 10,884,934 B1 | 1/2021 | Yochai | |
| 2003/0086098 A1 | 5/2003 | Sesek et al. | |
| 2004/0064577 A1 | 4/2004 | Dahlin et al. | |
| 2005/0193096 A1 | 9/2005 | Yu et al. | |
| 2006/0047663 A1 | 3/2006 | Rail | |
| 2006/0156387 A1 | 7/2006 | Eriksen | |
| 2006/0265552 A1 | 11/2006 | Davis et al. | |
| 2007/0033155 A1 | 2/2007 | Landsman | |
| 2007/0033569 A1 | 2/2007 | Davidson et al. | |
| 2007/0033588 A1 | 2/2007 | Landsman | |
| 2008/0228772 A1 | 9/2008 | Plamondon | |
| 2008/0228864 A1 | 9/2008 | Plamondon | |
| 2008/0228899 A1 | 9/2008 | Plamondon | |
| 2008/0228938 A1 | 9/2008 | Plamondon | |
| 2008/0229017 A1 | 9/2008 | Plamondon | |
| 2008/0229020 A1 | 9/2008 | Plamondon | |
| 2008/0229021 A1 | 9/2008 | Plamondon | |
| 2008/0229023 A1 | 9/2008 | Plamondon | |
| 2008/0229024 A1 | 9/2008 | Plamondon | |
| 2008/0229025 A1 | 9/2008 | Plamondon | |
| 2011/0219208 A1 | 9/2011 | Asaad et al. | |
| 2012/0047548 A1 | 2/2012 | Rowlands et al. | |
| 2012/0323872 A1 | 12/2012 | Vasquez Lopez et al. | |
| 2013/0132368 A1 | 5/2013 | Wolfram | |
| 2013/0159633 A1 | 6/2013 | Lilly | |
| 2014/0040191 A1 | 2/2014 | Beddoe et al. | |
| 2014/0082288 A1 * | 3/2014 | Beard | G06F 16/172 |
| | | | 711/123 |
| 2018/0285453 A1 | 10/2018 | Beckman et al. | |
| 2019/0065376 A1 | 2/2019 | Lee et al. | |
| 2019/0205059 A1 | 7/2019 | Cho | |
| 2019/0354619 A1 | 11/2019 | Jain et al. | |
| 2021/0132915 A1 | 5/2021 | Ivankovic et al. | |
| 2021/0263762 A1 | 8/2021 | Kachare et al. | |
| 2023/0086991 A1 | 3/2023 | Zhang et al. | |
| 2023/0185722 A1 | 6/2023 | Hibser et al. | |
| 2023/0185860 A1 | 6/2023 | Hibser et al. | |
| 2023/0244417 A1 | 8/2023 | Chen et al. | |

OTHER PUBLICATIONS

Notice of Allowance for U.S. Appl. No. 17/867,500, mailed Sep. 20, 2023.

Non-final Office Action, U.S. Appl. No. 17/867,347, mailed Dec. 8, 2023.

* cited by examiner

DOCUMENT LOCKING AND CACHE MEMORY MANAGEMENT IN CLOUD COMPUTING

CROSS-REFERENCE TO RELATED APPLICATIONS

This application is a continuation of U.S. patent application Ser. No. 17/867,500, entitled "Document Locking and Cache Memory Management in Cloud Computing," filed Jul. 18, 2022, which claims priority to U.S. provisional patent application Nos. 63/289,127, filed on Dec. 13, 2021, entitled "Queue Optimization in Cloud Computing;" 63/289,130, filed on Dec. 13, 2021, entitled "Queue Optimization Via Predictive Caching in Cloud Computing;" and 63/289,134, filed Dec. 13, 2021, "Document Locking and Cache Memory Management in Cloud Computing," the entire disclosures of which is hereby incorporated herein by reference.

FIELD OF THE DISCLOSURE

The present disclosure relates generally to document storage, and more particularly to more efficient techniques for object-based document storage.

BACKGROUND

Many current document storage systems are file-based storage systems. As is known, broadly speaking, in file-based storage systems, documents (or data) are placed in folders. The folders are nested under other folders, thereby creating a file path for the document. Furthermore, each document has a limited set a metadata associated with it (e.g., document name, document creation date, document modified date, etc.).

However, file-based storage systems have drawbacks, including poor scalability. For example, when the workload of the file-based storage system increases, bottlenecks may occur at the processor(s) of the system. In addition, when the system becomes overworked, performance further suffers in the document lookup tables of the file-based system as they grow to accommodate a massive amount of documents. In another drawback example, in file-based systems, the amount of metadata is limited.

An alternative to a file-based storage system is an object-based storage system, which is newer technology. In an object-based storage system, data (e.g., a document) may be bundled together along with metadata and an identifier (ID). Advantageously, object-based storage solves many of the drawbacks of file-based storage, including scalability. For example, because the address space is flat in an object-based storage system, additional nodes may easily be added to the system to accommodate an increased workload. In another example advantage, the metadata in an object-based storage system is customizable, and unlimited.

Yet, no suitable way currently exists for a company to transition from a file-based storage system to an object-based storage system. The techniques described herein solve this problem and others.

In addition, current object-based storage systems themselves have drawbacks. For instance, operations relating to the documents of the object-based storage are processed sequentially, resulting in a slow processing of the operations. In another example, companies wishing to access a large number of documents from an object-based storage system may pay a large financial cost because the company pays per time the object-based storage system is accessed. In yet another example, when a company interacts with an object-based storage system, the company may store documents going to or coming from the object-based storage system in a cache memory; however, the cache memory may become overburdened, resulting in slowdowns. The techniques described herein also solve these problems and others.

BRIEF SUMMARY

In one embodiment, a computer system for object-based data storage may be provided. The system may include: one or more queue processors configured to maintain a queue that stores a plurality of operations that interact with objects maintained at an object-based data storage; a read/write cache configured to cache (i) objects to be written to the object-based data storage, and (ii) objects that are read from the object-based data storage for provision to a requestor, wherein objects in the read/write cache are associated with a lock state; and one or more ingestion processors configured communicative coupled with the one or more queue processors and the read/write cache. The one or more ingestion processors may be further configured to: (1) set the lock state for objects being written to the object-based data storage to a locked state; (2) set the lock state for objects that finished writing to the object-based data storage to an unlocked state; (3) set the lock state for objects retrieved from the object-based data storage and not yet provided to a requestor to a locked state; (4) set the lock state for objects retrieved from the object-based data storage and provided to a requestor to an unlocked state; (5) delete, from the read/write cache, and according to a first target rate, the objects in the unlocked state if an amount of used memory in the read/write cache is below a read/write cache memory threshold or inode threshold; and (6) delete, from the read/write cache, and according to a second target rate, the objects in the unlocked state if an amount of used memory in the read/write cache is above the read/write cache memory threshold or inode threshold; wherein the second target rate is greater than the first target rate.

In another embodiment, a computer-implemented method for object-based data storage may be provided. The method may comprise: (1) maintaining, with one or more queue processors, a queue of operations relating to a plurality of objects maintained at an object-based data storage; (2) setting, with one or more ingestion processors, the lock state for objects being written to the object-based data storage to a locked state; (3) setting, with the one or more ingestion processors, the lock state for objects that finished writing to the object-based data storage to an unlocked state; (4) setting, with the one or more ingestion processors, the lock state for objects retrieved from the object-based data storage and not yet provided to a requestor to a locked state; (5) setting, with the one or more ingestion processors, the lock state for objects retrieved from the object-based data storage and provided to a requestor to an unlocked state; (6) deleting, with the one or more ingestion processors, from the read/write cache, and according to a first target rate, the objects in the unlocked state in response to an amount of used memory in the read/write cache being below a read/write cache memory threshold or inode threshold; and (7) deleting, with the one or more ingestion processors, from the read/write cache, and according to a second target rate, the objects in the unlocked state in response to an amount of used memory in the read/write cache being above the read/write cache memory threshold or inode threshold; wherein the second target rate is greater than the first target rate.

In yet another embodiment, a computer system for object-based data storage may be provided. The system may include: a queue processor configured to maintain a queue that stores a plurality of operations that interact with objects maintained at an object-based data storage; a read/write cache configured to cache (i) objects to be written to the object-based data storage, and (ii) objects that are read from the object-based data storage for provision to a requestor, wherein objects in the read/write cache are associated with a lock state; a non-transitory computer readable medium storing processor-executable instructions. The instructions, when executed by an ingestion processor, cause the ingestion processor to: (1) set the lock state for objects being written to the object-based data storage to a locked state; (2) set the lock state for objects that finished writing to the object-based data storage to an unlocked state; (3) set the lock state for objects retrieved from the object-based data storage and not yet provided to a requestor to a locked state; (4) set the lock state for objects retrieved from the object-based data storage and provided to a requestor to an unlocked state; (5) delete, from the read/write cache, and according to a first target rate, the objects in the unlocked state if an amount of used memory in the read/write cache is below a read/write cache memory threshold or inode threshold; and (6) delete, from the read/write cache, and according to a second target rate, the objects in the unlocked state if an amount of used memory in the read/write cache is above the read/write cache memory threshold or inode threshold; wherein the second target rate is greater than the first target rate.

DETAILED DESCRIPTION

I. Overview

Figure 1:
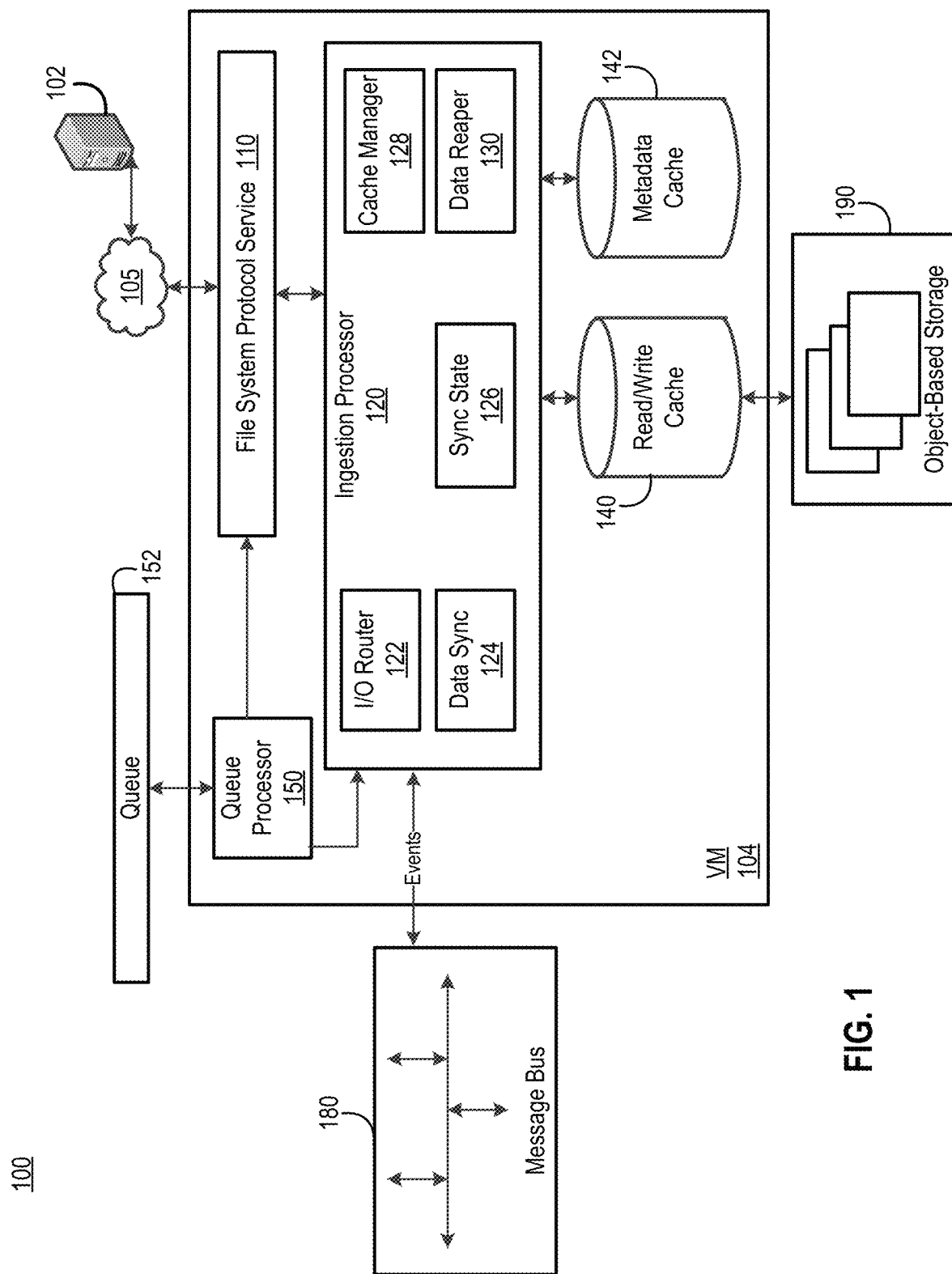
FIG. 1 illustrates an example environment that may be used to implement the techniques for efficient object-based data storage, according to an embodiment.

The present techniques relate to efficient object-based data storage of documents. As it is used herein, the term "document" refers to any collection of data that conveys information to a user of a client device and/or an application executing on a client device. For example, the document may be a Microsoft Word file, a text file, an email, a pdf, a presentation, a spreadsheet, an image, a messaging file format, an audio file, and/or other documents. As it is generally used herein, an object refers to any type of data that can be represented by a software object (e.g., a document file, document fragment, a metadata file, an unstructured data file, and/or other data types). Accordingly, the term "document" may refer to either the document file (e.g., a .doc or .txt file) or the corresponding object(s) from which the document (or a portion thereof) can be derived.

Briefly, in an object-based storage system, data (e.g., a document) may be bundled together along with metadata and a unique ID. Object-based storage advantageously solves many of the drawbacks of file-based storage, including scalability. For example, because the address space is flat in an object-based storage system, additional nodes may easily be added to the system to accommodate an increased workload. In another example advantage, the metadata in an object-based storage system is customizable, and unlimited; and thus the metadata may advantageously tailored to a particular application. It should be appreciated that some object-based storage protocols do not support document metadata. Accordingly, the metadata may be maintained separately from the document (e.g., maintained in a metadata cache), or incorporated into the document object itself. Accordingly, while the following description sets out techniques for handling the metadata as a separate object stored in a metadata cache, references to the metadata file or metadata cache envision alternate actions related to storing the metadata in as part of the document itself. Furthermore, advantageously, object-based storage both: (i) permits for addressing of individual objects by more than simply a document name and file path (e.g., by the unique ID), and (ii) permits the unique ID to be used within a bucket or across the system, thereby supporting larger namespaces to eliminate name collisions.

In addition, the techniques described herein advantageously facilitate the processing of documents. For instance, a system may store a document in an object-based storage, and then accessed by another part of the system for processing thereof. In one example, a company may have a large number of documents which the company wishes to use an artificial intelligence (AI) algorithm on to process, such as by performing highlighting or redaction on. To this end, the techniques described herein allow for the documents to be stored in an object-based storage, and then selectively accessed by other components for processing.

II. Example Computing Environment

FIG. 1 depicts an example data storage environment 100 that may be used to implement the disclosed object-based storage techniques. As illustrated, the environment 100 includes a server 102 communicatively coupled to a virtual machine (VM) 104 via network 105. The network 105 may be a single communication network, or may include multiple communication networks of one or more types (e.g., one or more wired and/or wireless local area networks (LANs), and/or one or more wired and/or wireless wide area networks (WANs) such as the Internet). The VM 104 may be instantiated on a cloud of servers, or server farm. The server 102 may be a web server, a back-end server, a client/tenant server or any combination thereof.

The VM 104 acts, in some aspects, as an interface between the server 102, and the object-based storage 190. In this regard, the VM 104 may include file system protocol service 110 (e.g., SAMBA, Server Message Block (SMB), Common Internet File System (CIFS), etc.). It may be noted that in a file-based storage system, a server (e.g., server 102) may communicate with the file-based storage system through a system protocol service similar to the file system protocol service 110 in the example of FIG. 1. That is, the file system protocol service 110 may be configured to receive and process the same commands as a conventional file system protocol service, except that instead of interfacing with a file-based data storage to process the command, the file system protocol service 110 interfaces with the object-based storage 190. Thus, the example system of FIG. 1 advantageously may be used to implement a smooth transition for a company that wishes to switch from a file-based storage system to an object-based storage system. In other words, in a previous, file-based storage system, the company servers 102 would communicate with a file system protocol service 110, and in a new, object-based storage system (such as in the example of FIG. 1), the company servers 102 may still continue to communicate with a file system protocol service 110; and thus no (or only minimal) change would be necessary to switch systems from the perspective of the servers 102. Of course, the VM 104 can process commands in a protocol native to the object-based storage 190 as well.

In this respect, and broadly speaking, the document storage system 100 may also facilitate the processing of documents. For instance, documents may be first sent from the servers 102 to the object-based storage 190; and subsequently, documents may be selectively accessed via the servers 102 for processing (e.g., to highlight a document, redact a document, analyze a document, select a document for batch review, etc.).

Further regarding the VM 104, the VM 104 may be an emulation of a computer system to provide the functionality of the computer system. To this end, the VM 104 may include hardware, software, or any combination thereof. The VM 104 may be run on a host, which may be running any number of other VMs. In some implementations, the VM 104 may be run on the same server or group of servers as the object-based storage 190. The VM 104 may use any type of supported operating system (e.g., Windows, Linux, etc.). In addition, the VM 104 may be implemented as any type of VM (e.g., system VM, process VM, etc.). It should be appreciated that any software component of FIG. 1 within the VM 104 may be implemented as a software module that executes on the VM 104. Similarly, any storage component of FIG. 1 (e.g., a cache) within the VM 104 may utilize storage resources allocated with the VM 104 in the cloud computing system that instantiates the VM 104.

As illustrated, the example system 100 includes a queue 152 that stores a plurality of operations. As should be understood, the queue 152 may generally be a first-in-first-out (FIFO) data structure, and thus the operations may be added to the "end" of the queue 152 and read for processing at the "front of the queue 152. It should be appreciated that any application or computing system with access to the object-based storage 190 may be configured to add operations to the queue 152. For example, a collection application may collect documents from user devices and add write commands to the queue 152 to store the collected documents in the object-based storage 190. As another example, a processing application may be configured to modify documents stored in the object-based storage 190 to include labels determined via user review and/or a machine learning model. In some embodiments, the operations are written to the message bus 180 and added to the queue 152 by the queue processor 150.

In some embodiments, the queue processor 150 may be configured to analyze operations to be added to the queue 152 or that have been recently added to the queue 152 to extract one or more metadata fields associated with the operation. For example, the metadata fields may include a time, an document, a file path associated with a document, a requestor, and/or other metadata that enable efficient identification of related operations.

The queue processor 150 may be configured to process operations within the queue 152. Accordingly, the queue processor 150 may analyze the operation at the front of the queue 152 to process the operation and/or perform one or more of the queue efficiency techniques described herein. In some embodiments, the queue 152 may be configured to store operations configured in accordance with both a file system protocol and an object-based storage protocol. Accordingly, if the queue processor 150 determines that the operation is formatted in accordance with the file system protocol, the queue processor 152 may route the operation to the file system protocol service 110 for processing thereof. On the other hand, if the operation is formatted in accordance with an object-based storage protocol, the queue processor 150 may route the operation to the ingestion processor 120 for processing. It should be appreciated that even if the operation is formatted in accordance with the file system protocol, the queue processor 150 may still notify the file system protocol service 110 of the operation to update the file-based directory to ensure that file structure is synchronized between the file system protocol service 110 and the object-based storage 190.

In some embodiments, prior to routing the operation to the file system protocol service 110 or the ingestion processor 120, the queue processor 150 may analyze the queue 152 to identify any other operations in the queue 152 that are impacted by the current operation to ensure efficient processing of each of the operations. For example, the queue processor 150 may be configured to identify any operations that interact with the same document or documents in the same file path to improve the parallelization of each of the operations and/or identify a document to predictively load into the read/write cache 140. Based on these analyses, the queue processor 150 may be configured to move operations within the queue 152 to ensure the improved parallelization and/or add operations to the queue 152 (or create new operations that bypass the queue 152 altogether) to load the read/write cache 140 in accordance with the prediction.

As the name suggests, the file system protocol service 110 may process commands configured in accordance with a protocol for interacting with a conventional file-based storage. However, instead of executing the commands to interact with a physical file-based storage, the file system protocol service 110 converts or translates the commands into different commands configured in accordance with a protocol for the object-based storage 190. Accordingly, the file system protocol service 110 routes the converted commands to the ingestion processor 120 for processing thereof. More particularly, the file system protocol service 110 may route the converted commands to the I/O router 122 of the ingestion processor 120.

In addition, the file system protocol service 110 may maintain a directory of any or all documents in the example system 100. The directory may include a file path for each document. Thus, a file path may exist for each document in the system 100 even though the documents are stored in the object-based storage 190 according to an ID rather than a file path. This enables third party applications that utilize the file system protocol to interact with the object-based storage 190 without updating their modules to instead utilize the object-based protocol.

Figure 2:
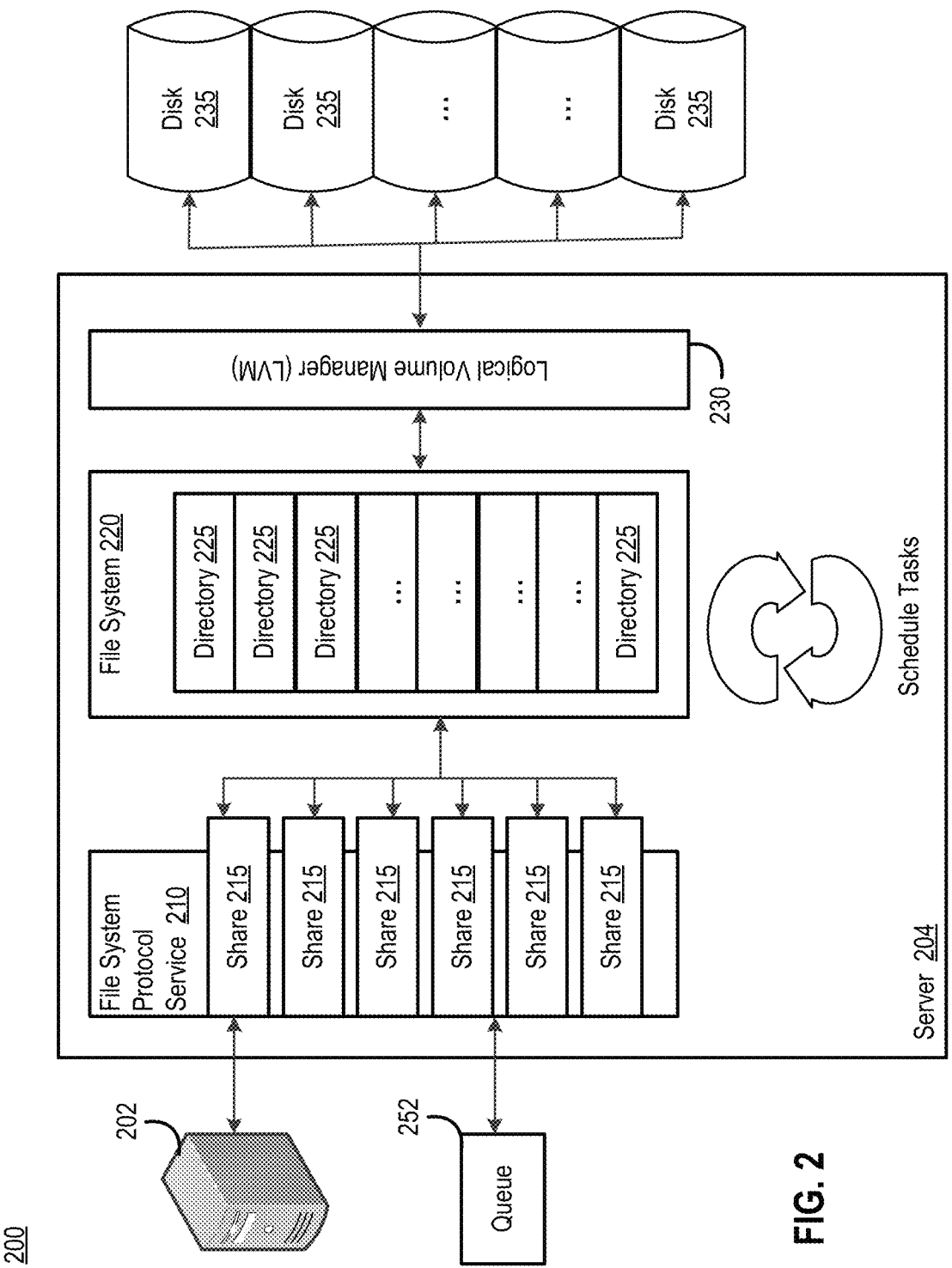
FIG. 2 illustrates an example file-based storage system.

As such, the example system 100 of FIG. 1 is in contrast to a conventional file-based system. For instance, FIG. 2 illustrates an example file-based storage system 200 where the file system 220 maintains directories 225 of all documents. The directories 225 include the file paths of the documents, and the documents are stored in the disks 235 according to the file paths (and not according to an ID as in the object-based storage 190 in the example of FIG. 1). It may also be noted that in some file-based storage systems, the directories 225 are part of the file system protocol service 210. To process an operation (e.g., from queue 252) in the file system protocol, the file system protocol service 210 causes the logical volume manager 230 to store the documents in the disks 235 in a manner that maintains the hierarchical nature of file system storage. Accordingly, the LVM 230 of the example of FIG. 2 is not necessary in the example object-based storage system 100 of FIG. 1 because the file system protocol service 110 processes the operations to interact with the object-based storage 190 via the ingestion processor 120. Said another way, although the file system protocol service 110 may still process commands of the file system protocol, the underlying storage system is a scalable object-based storage 190 instead of the inflexible disk-based storage system 235.

Further regarding the example file-based system 200 of FIG. 2, it should be appreciated that as more documents are added (e.g., via the server 202, and though the share modules 215), it may be necessary to increase the number of directory modules 225. As this shows, an object-based storage system has an advantage over this example file-based system because the object-based system would not need to increase the number of such modules (e.g., because of the object-based system's ID).

Returning to FIG. 1, the ingestion processor 120 may be configured to process operations to interact with the object-based storage 190. More particularly, the ingestion processor 120 may be configured to detect operations received via the I/O router 122 for processing thereof. For example, if the operation is a write operation, a data sync routine 124 of the ingestion processor 120 may obtain the document to be written to the object-based storage 190 and store the document in the read/write cache 140 and, in some embodiments, the corresponding metadata in the metadata cache 142. Similarly, if the operation is a read operation, the ingestion processor 120 may generate a document request to the object-based storage 190 that indicates the desired document. Upon receiving the document from the object-based storage 190, the data sync routine 124 may store the retrieved document in the read/write cache 140 and, in some embodiments, the corresponding metadata in the metadata cache 142 until the document is provided to the requestor. It should be appreciated that the ingestion processor 120 may aggregate a plurality of read operations into a single transaction that is sent to the object-based storage 190. Accordingly, by improving the parallelization and/or identifying documents that can be predictively loaded, the ingestion processor 120 may reduce the number of transactions sent to the object-based storage 190.

It should be appreciated that a user doesn't typically interact with the entirety of an access document. For example, a user may be able to determine a document's relevance based upon an analysis of the first few pages of a document that is twenty pages long. As such, storing the data associated with the later pages of the document in the read/write cache in response to the initial read command may be an inefficient use of the limited cache storage. Accordingly, in some embodiments, when the data sync routine 124 writes a new document to the object-based storage 190, the data sync routine 124 may divide the document into a plurality of associated document fragment objects. Thus, when the ingestion processor 120 detects a read command related to a document, the data sync routine 124 may be configure to obtain only the document fragment objects that correspond to the initial portions of the document as opposed to a document object that represents the entire document.

The read/write cache 140 and the metadata cache 142 are used to store documents and their corresponding metadata. Each of the caches 140, 142 may have memory sizes regulated by the VM 104, ingestion processor 120, and/or the cache manager 128. The amount of memory may be regulated as a cumulative amount of memory between the caches 140, 142, or separately for each cache 140, 142. In one example, the read/write cache 140 is allowed to store 1.5 terabytes of data, and the metadata cache memory 142 is allowed to store approximately 40 million inodes. However, if needed, the memory size and/or the number of inodes may be increased by the VM 104 and/or the cache manager 128. For example, if the servers 102 upload a massive amount of documents in a short time period such that the documents may not be able to written to the object-based storage 190 in a timely fashion, the amount of memory in the caches 140, 142 may need to be temporarily increased (e.g., to 5 terabytes, 10 terabytes, 100 million inodes, etc.) to accommodate the increased operation flow.

As illustrated, the system 100 may also include a data reaper 130. Although illustrated as a separate component from the cache manager 128, in some embodiments, the data reaper 130 is implemented as part of the cache manager 128. In some implementations, the cache manager 128 may perform any or all of the functions of the data reaper 130. In some embodiments, the data reaper 130 is a process instantiated by the ingestion processor 120 that continuously runs on the VM 104.

The data reaper 130 may be configured to clean one or both of the cache memories 140, 142 by deleting and/or evicting data from them. In some implementations, and as will be explained in further detail below, the data reaper 130 may delete only data that is in an unlocked state from the cache memories 140, 142. It should be appreciated the cache memories 140, 142 may use multiple lock types. For example, a reader lock enables other processes to read the object, but another process cannot write the object to the object-based storage 190 until all of the reads are complete. As another example, a writer lock may block other processes from either reading the object from the object-based storage 190 or writing the object to the object-based storage 190 until the write process completes. For example, the ingestion processor 120 may set a document being written to the object-based storage 190 to a writer locked state when it is first stored in the read/write cache 140; and, when the document is finished being written to the object-based storage 190, set the writer locked state of the document to unlocked. In another example, the ingestion processor 120 may set an object retrieved from the object-based data storage 190 and not yet provided to a requestor (e.g., server 102, etc.) to a reader locked state when it is first stored in the read/write cache 140; and, when the corresponding document is provided to a requestor (e.g., server 102, etc.), set the reader locked state of the object to unlocked. Similarly, the ingestion processor 120 may set an object to a reader locked state when the object is in a working memory associated with the requestor and, upon receiving an indication that the requestor is finished processing the object, set the reader locked state to unlocked. Accordingly, documents stored in the read/write cache 140 and/or metadata files stored in the metadata cache 142 may be associated with a flag indicative of the lock state (e.g., unlocked, reader locked, or writer locked).

Furthermore, the data reaper 130 may be configured to reap (e.g., delete documents, data, etc.) at different target rates (e.g., in bits per second, documents per time period, etc.). In some embodiments, the target rates are based on a watermark (e.g., a threshold amount of data in the read/write cache 140 and/or metadata cache 142). Any number of watermarks and/or target rates may be used.

In this respect, the data reaper 130 may be configured to set a target rate, rather than a direct rate. This is because, in practice, the actual deletion rate is not set directly by the data reaper 130, and further may depend on other factors (e.g., central processing unit (CPU) utilization, etc.) besides the target rate. For example, in some embodiments, the data reaper 130 sets the target rate and deployment management process (e.g., an autoscaler) determines a number of data reaper processes that need to run in parallel to achieve the target rate. To this end, the higher the target rate, the more individual processes of the data reaper 130 be instantiated. The actual memory deletion rate may be influenced by CPU utilization and other factors, and thus is not the target rate. Accordingly, the autoscaler may be configured to instantiate/delete individual processes of the data reaper 130 to achieve the target rate.

Accordingly, in some embodiments, as the amount of memory used in the caches 140, 142 increases, the system 100 may one or both of: increase a memory size of one or both of the caches 140, 142; and/or change a target rate at which data is deleted from one or both of the caches 140, 142.

As described above, the data sync 124 may be used to load data into the caches 140, 142. Additionally or alternatively, the data sync 124 may slice data before it is stored to the object-based storage 190. That is, rather than store entire documents or document fragments as individual objects, the object-based storage 190 may divide the document or document fragment into smaller slices that can be stored separately from one another. This is advantageous as it may enable the object-based storage 190 more flexibility in where the slices are stored. It should also be appreciated that the documents and/or document fragments may be sliced by any component of the system 100 (e.g., the ingestion processor 120, the data sync 124, etc.).

In addition, each individual slice may be limited to a memory size of less than a predetermined individual memory slice size. The predetermined individual memory slice size may be controlled, for example, by the ingestion processor 120 and/or the data sync 124.

Further as illustrated, the ingestion processor 120 may also include sync state 126, which may change the lock state of an object. For example, after an object (and/or each of the slices thereof) is written to the object-based storage 190 from the read/write cache 140, the sync state 126 may change the lock state of the object (and/or the slices thereof) to unlocked. Similarly, when executing a read operation, the sync state 126 may track the slices of the document as they are provided by the object-based storage 190.

Still further as illustrated, the system 100 may also include a message bus 180. In some embodiments, the message bus 180 is a shared bus that is accessible by a plurality of applications that relate to the data maintained at the object-based storage 190 (e.g., those associated with the servers 102). The message bus 180 may record events as they happen through the system 100. For example, the ingestion processor 120 may record read/write events to/from the message bus 180 in response to the associated action occurring, thereby informing the applications associated with the server 102 as to the status of the read/write operations performed by the ingestion processor 120. In one implementation of this, the applications executing on the servers 102 may be waiting to receive documents and/or instructions from the VM 104; and, in this regard, the applications executing on the servers 102 may monitor the event bus 180 to, for example, determine when to start processing a document, or include a document in a batch of documents for review. It should be appreciated that while the example of FIG. 1 does not show a connection between the servers 102 and event bus 180, the servers 102 and event bus 180 may be communicatively coupled by any suitable means.

In this regard, some operations (e.g., independent operations) must be performed before other operations (e.g., dependent operations). For example, if there is an operation to create a particular document, and another operation to rename the particular document (or rename a directory or folder in the file path of the particular document), the create operation (here, the independent operation) must be performed before the rename operation (here, the dependent operation). In some embodiments, the queue processor 150 maintains a decision directory or map comprising a hierarchy of operations indicating which operations gate the performance of other operations.

In this way, the system 100 advantageously may enable parallel processing of operations in the queue 152. For example, there may be one independent operation, that, when performed, enables the performance of ten dependent operations. In this example, the system 100 may, via the queue processor 150, advantageously first perform the independent operation, and then subsequently perform, in parallel, the remaining ten dependent operations regardless of the position of the independent operation and dependent operations in the queue 152, thereby greatly increasing processing efficiency.

In addition, it should be understood that the VM 104 (and the components thereof) may be instantiated via one or more servers that include one or more processors (e.g., one or more microprocessors, one or more CPUs, one or more GPUs, etc.). Generally, the one or more processors are configured to execute software instructions stored in one or more memories of the server (e.g., stored in a persistent memory such as a hard drive or solid state memory) to instantiate the VM 104. It should be appreciated that certain instructions may be more efficiently executed by different types of processors. Accordingly, the servers that instantiate the VM 104 may be configured to execute different instructions using the different processor types. Additionally, the one or more processors and/or the one or more memories of the servers that instantiate the VM 104 may be located in different physical units and connected via a distributed computing platform. Moreover, the VM 104 may instantiate multiple copies of any of the components therein to perform the disclosed functionality in parallel. For example, the VM 104 may instantiate one or more queue processors 150 and/or one or more ingestion processors 120.

III. Example Techniques for Analyzing a Queue to Increase Parallelization

Some embodiments advantageously increase parallelization of operations in the queue 152. Increasing parallelization of operations results in the operations overall being processed more quickly, and further results in reduced use of computer system resources. In addition, the increased parallelization may be advantageous for companies that pay a fee per transaction with the object-based storage 190.

Figure 3:
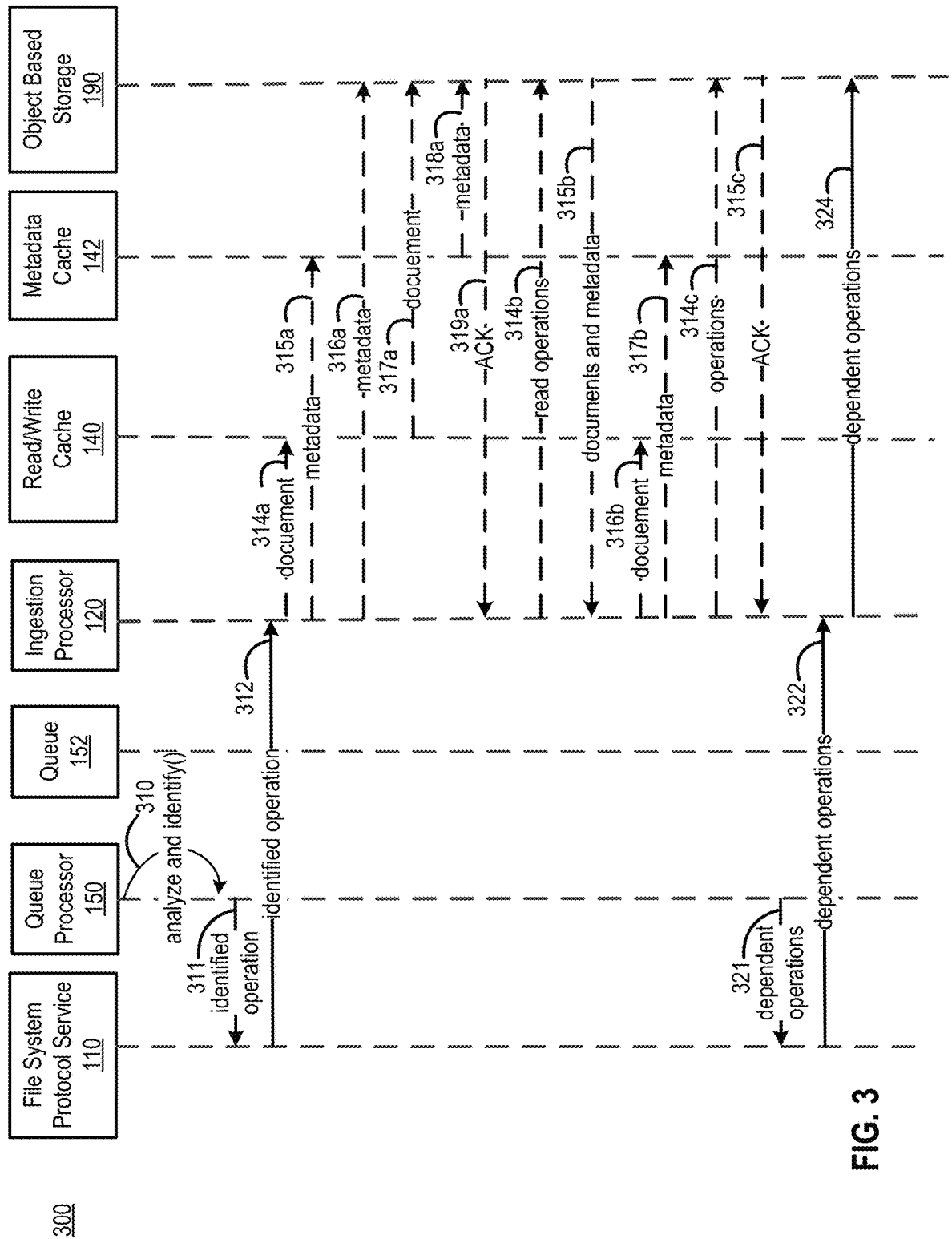
FIG. 3 illustrates an example signal diagram for analyzing a queue to reduce queue processing time via parallelization, according to an embodiment.

FIG. 3 illustrates an example signal diagram 300 for analyzing a queue to improve the parallelization of processing operations in the queue 152, according to an embodiment. More particularly, the signal diagram 300 illustrates the signals exchanged and/or detected by various components of an object-based data storage environment, such as the environment 100 of the example of FIG. 1. It should be understood that any reference to a particular operation simultaneously refers to processing a transaction that indicates that the particular operation is to be performed.

The signal diagram 300 begins when the queue processor 150 analyzes (310) the operations in the queue 152 to identify an independent operation to perform which allows for the parallelization of performance of dependent operations. In this regard, and as discussed above, some operations (e.g., independent operations) must be performed before other operations (e.g., dependent operations). For example, if there is an operation to create a particular document, and another operation to rename the particular document (or rename a directory or folder in the file path of the particular document), the create operation (here, the independent operation) must be performed before the rename operation (here, the dependent operation).

In some embodiments, the queue processor 150 executes the analyze and identify (310) routine when processing an operation at the front of the queue 152 to identify an independent operation location elsewhere in the queue 152. In other embodiments, the queue processor 150 is configured to constantly monitor the queue 152 as a whole to identify independent operations located behind dependent operations within the queue 152. Although the analyze and identify (310) routine is only illustrated at one point in the example of FIG. 3, in some embodiments, the analyze and identify (310) routine may run continuously and/or be executed at multiple points throughout the process 300. For example, in some embodiments, placing a new operation (or a threshold number of operations) in the queue 152 triggers the execution of the analyze and identify (310) routine. Additionally or alternatively, the analyze and identify (310) routine may be executed at a specified time or according to a specified time period.

In some embodiments, the analyze and identify 310 routine comprises two parts. First, the queue processor 150 (and/or the ingestion processor 120) may analyze the operations to identify operations related by at least one of (i) a document (or any data associated with the document, including metadata, etc.), (ii) a file path, or (iii) a type of operation. In this regard, it may be noted that although the documents are not stored in the object-based storage 190 according to the file path (rather they are stored according to the ID), the file system protocol service 110 may maintain a directory of the file paths of the documents; and thus, the operations in the queue 152 may be analyzed according to file paths. This analysis may yield group of related operations.

Second, the queue processor 150 may analyze this group of related operations to identify the independent and dependent operations. To accomplish this identification, the queue processor 150 may use a decision directory comprising a hierarchy of operations showing which operations must be performed before other operations. Once identified, the queue processor 150 may rearrange the operations in the queue 152. For example, identified dependent operations may be grouped together in the queue 152 and/or brought closer towards the front of the queue 152. Additionally or alternatively, if the independent operation is identified to be at a later position in the queue 152 than any of the dependent operations, the queue processor 152 may swap the queue position of the independent operation with any of the dependent operations to thereby bring the independent operation closer to the front of the queue 152. Additionally or alternatively, the identified independent operation may simply be brought to the front of the queue 152 or closer to the front of the queue 152. In still other embodiments, the queue processor 150 pulls the group of operations out of the queue 152 while rearranging the group of operations into the determined order of operations.

In some implementations, this positioning of the independent and/or dependent operations enables the ingestion processor 120 and/or the object-based storage 190 to parallelize more operations due to rearranged order of operations that ensures the execution of an independent operation before the corresponding dependent operations in the queue 152. In this way, the system 100 advantageously may increase the parallelization of processing operations in the queue 152. For example, there may be one independent operation, that, when performed, enables the parallel performance of ten dependent operations. However, if five of the dependent operations are positioned in the queue before the independent operation and the other five dependent operations are positioned in the queue after the independent operation, it may not be possible to execute all ten dependent operations in parallel. Accordingly, performing the independent operation out of order (at least with respect to how the operation was placed into the queue 152) avoids segmenting operations that would otherwise be parallelized into two or more batches of parallelized operations.

The queue processor 150 may then send (311) the identified independent operation (or an indication thereof) to the file system protocol service 110. If the independent operation is not in a format suitable for object-based storage systems (e.g., in a file-based storage system format), the file system protocol service 110 may translate the operation to be in such a suitable format. Upon receipt of the identified operation, the file system protocol service 110 may updated a file path of the corresponding document.

The file system protocol service 110 then sends (312) the identified independent operation (possibly with the format changed) to the ingestion processor 120. In some alternate embodiments where it is not necessary to change the format of the operation, the identified operation may be sent directly from the queue processor 150 to the ingestion processor 120.

From here, the signal diagram may proceed in different ways depending on the identified independent operation. To this end, the following will illustrate three examples of identified independent operations: a write operation (314*a*, 315*a*, 316*a*, 317*a*, 318*a*, 319*a*); a read operation (314*b*, 315*b*, 316*b*, 317*b*); and a modify or delete operation (314*c*, 316*c*). However, other types of identified independent operations are possible; and these examples should be viewed as illustrative, and not restrictive.

In the example of the identified independent operation being a write operation, the ingestion processor 120: sends (314*a*) the document to be written (or slices thereof) to the read/write cache 140; and, in the illustrated example, sends (315*a*) the corresponding metadata to the metadata cache 142. It should be appreciated that although not illustrated in FIG. 1, the document may be first retrieved from the server 102 or other location indicated in the write operation. Next, the ingestion processor 120 (e.g., via the data sync 124) sends (316a) the write command(s) to the object-based storage 190; and accordingly, the document and the corresponding metadata is written (317a, 318a) to the object-based storage 190. If the write is successful, the object-based storage 190 then sends (319a) an ACK message to the ingestion processor 120 acknowledging that the document was successfully written.

In the example of the identified independent operation being a read operation, the ingestion processor 120 packages the read operation with other read operations, and sends (314b) the read operations to the object-based storage 190. The documents (and/or document fragments) and metadata indicated by the read requests are then retrieved (315b) from the object-based storage 190 and sent to the ingestion processor 120. In response, the ingestion processor 120 stores (316b) the documents (and/or document fragments) in the read/write cache 140, and stores (317b) the metadata in the metadata cache (142).

In the example of the identified independent operation being a modify operation or a delete operation, the ingestion processor 120 may package the operation with other operations into a transaction, and send (314c) the transaction to the object-based storage 190. The object-based storage 190 then sends (315c) an ACK message to the ingestion processor 120 acknowledging that the operation(s) are complete.

As illustrated, the queue processor 150 may be configured to send the dependent operations (321) to file system protocol service 110. As above with respect to the independent operation, if the dependent operations are not in a format suitable for object-based storage systems (e.g., in a file-based storage system format), the file system protocol service 110 may translate the operation(s) to be in such a suitable format. In addition, upon receipt of the dependent operation(s), the file system protocol service 110 may update a file path of the corresponding document. Alternatively, where it is not necessary to change the format of the operation, the identified operation may be sent directly from the queue processor 150 to the ingestion processor 120.

The file system protocol service 110 then sends (322) the identified dependent operations (possibly with the format changed) to the ingestion processor 120. The dependent operations may be sent together to the ingestion processor 120 for execution by the ingestion processor 120 and/or the object-based storage 190 in parallel, thus increasing system efficiency. The ingestion processor 120 may then send (324) the dependent operations to the object-based storage 190 for processing. It should be appreciated that while the signal diagram 300 shows the queue processor 150 separately routing the independent operation and the dependent operations, the queue processor 150 may be configured to send the independent operation and the dependent operations as an ordered group of operations as part of the same batch of operations. By sending (324) the operations as a group of ordered operations to the object-based storage 190, the object-based storage 190 is able to process each of the group of operations in parallel without being gated by the independent operation.

Upon receiving the dependent operations, the ingestion processor 120 may process the operations in a similar manner as the independent operation. That is, for a rename operation, the object-based-storage 190 would process the rename operation, and then send an ACK to the ingestion processor 120 when the rename operation is complete. For a write operation, the system may follow events analogous to the example in signals 314a, 315a, 316a, 317a, 318a, 319a. For a read operation, the system may follow events analogous to the example in signals 314b, 315b, 316b, 317b. For a modify or delete operation, the system may follow events analogous to the example in signals 314c, 316c.

In addition, to even further increase the efficiency of processing transactions in the queue 152, the system 100 (e.g., via the queue processor 150, the ingestion processor 120, etc.) may "nullify" certain operations in the queue 152 when analyzing the group of related operations. For instance, if, subsequent to placing an operation in the queue 152, it becomes unnecessary to perform the operation, the queue processor 150 may remove the operation from the queue 152. For example, if the queue 152 first receives a first operation to create a document and subsequently receives a subsequent operation to delete the document, the queue processor 150 may remove, from the queue 152, both the create operation and the delete operation before the document is even created. This advantageously increases system speed and efficiency.

Furthermore, the example signal diagram 300 should be viewed as illustrative, and not restrictive. For example, not all of the events must happen specifically as illustrated in the example signal diagram 300. For instance, the ingestion processor 120 may perform any of the functions of the queue processor 150 illustrated in the example of FIG. 3. For example, the ingestion processor 120, rather than the queue processor 150, may analyze the queue 152 to identify the independent operation. Moreover, many of the events illustrated in the signal diagram 300 may be performed by components other than those illustrated performing the events.

In addition, although not illustrated in FIG. 3, the queue processor 150 and/or the ingestion processor 120 may record events to the message bus 180 as they happen. For instance, it may be recorded on the message bus 180 that an independent operation has been identified (310). In another example, read/write events to/from the object-based storage 190 may be recorded to the message bus 180 as they happen (e.g., at any of 314, 316, 324 and/or 326). In this regard, the queue processor 150 creates a record of events which is easily accessible over the message bus 180.

As described elsewhere herein, in some embodiments, the metadata of the document is maintained as part of the document itself. That is, instead of creating a separate metadata file for storage at the metadata cache 142, the ingestion processor 120 may modify the document to include indications of the metadata. For example, the ingestion processor 120 may create a slice of the document dedicated to the metadata. Accordingly, in these embodiments, when processing a write operation, storing the metadata to the metadata cache 142 envisions the ingestion processor 120 alternatively storing the metadata as part of the document itself. Similarly, in these embodiments, when processing a read operation, the ingestion processor 120 obtaining the metadata from the metadata cache 142 envisions the ingestion processor 120 alternatively obtaining the metadata from the modified document.

Figure 4:
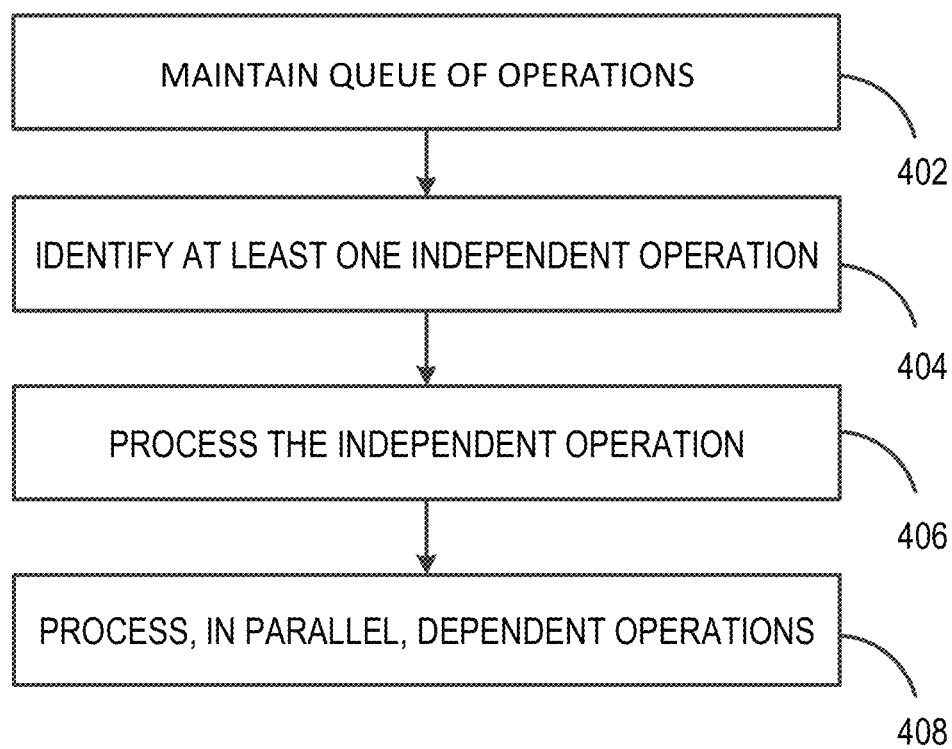
FIG. 4 depicts an example flow diagram of a method for analyzing a queue to reduce queue processing time via parallelization, according to an embodiment.

FIG. 4 depicts an example flow diagram 400 of a method for analyzing a queue to increase parallelization, according to an embodiment. The method 400 may be performed by one or more processors that instantiate the VM 104. More particularly, the one or more processors may by the one or more processors that execute the instructions of the software module that corresponds to the queue processor 150 and/or the ingestion processor 120 of the VM 104.

The example flow diagram 400 may begin at block 402 by maintaining, with the one or more processors, the queue 152. For example, the one or more processors may add received transactions to the queue 152 or remove operations from the queue 152 after processing. The operations may have been received from the server 102. Additionally or alternatively, the operations may have been received from a customer (not shown in FIG. 1) of a company of the servers 102. For instance, if a customer is providing documents to the server 102 for analysis, in some embodiments, the customer may send operations to the VM 104.

At block 404, the one or more processors identifies at least one independent operation in the queue 152 that must be processed prior to processing at least one dependent operation to thereby enable parallelization of processing of operations in the queue 152. The independent operation may have been placed in the queue 152 subsequent to the dependent operations and, as such, gate the ability to execute the dependent operations in parallel. In some embodiments, the identifying of the at least one independent operation in the queue 152 that must be processed prior to processing at least one dependent operation includes identifying a group of operations in the queue 152 according to at least one of: (i) a document, (ii) a file path, or (iii) a type of operation. It should be appreciated that although the documents are not stored in the object-based storage 190 according to the file path (rather they are stored according to the ID), the file system protocol service 110 may maintain a directory of the file paths of the documents; and thus the operations in the queue 152 may be analyzed according to file paths of the unattached directory. In some examples, the group of operations include a write or modify operation to the object-based data storage operation, and a read operation from the object-based data storage operation.

To identify the at least one independent operation, the one or more processors may analyze a decision directory. For example, the group of operations may comprise a create operation for a particular document, and a rename operation for the particular document. In this example, the operations in the queue 152 include a rename operation set to be processed prior to a create operation. However, the decision directory may indicate that the rename operation is dependent with respect to the create operation. Accordingly, the one or more processors may the identify the create operation as the at least one independent operation and the rename operation as the at least one dependent operation.

In another example, the group of operations include an operation to create a document and an operation to delete the document. Accordingly, in response to identifying the operation to delete the document of the plurality of documents, the one or more processors may remove, from the queue 152, both the operation to create the document, and the operation to delete the document.

At block 406, the queue processor 150 and/or ingestion processor 120 processes the independent operation. For example, the queue processor 150 may send the independent operation to the ingestion processor 120 for processing; and the ingestion processor 120 may then interact with the read/write cache 140, the metadata cache 142 and/or object-based storage 190 to process the operation. For instance, if the operation is an operation to write a document to the object-based storage 190, the ingestion processor 120 may control the read/write cache 140 and/or metadata cache 142 to write the document and/or metadata to the object-based storage 190.

In some embodiments, the ingestion processor 120 and/or the data sync 124 also slices the documents of the plurality of documents into individual slices, wherein each individual slice of the individual slices has a memory size of less than a predetermined individual slice memory size.

At block 408, subsequent to the processing of the independent operation, dependent operations are processed in parallel. As discussed above, the parallel processing of the dependent operations is made possible because the independent operation has already been processed. For example, in some embodiments, the group of operations comprises a create operation for a particular directory, and the one or more dependent operations comprise operations to store two or more documents in the created directory. Accordingly, the one or more processors may first process the create directory operation, then process the store operations in parallel.

It should be appreciated that any reference to the one or more processors processing operations in parallel may refer to ordering and/or packaging the operations such as to enable the object-based storage 190 performs the operations in parallel. It should be appreciated that other embodiments may include additional, fewer, or alternative functions to those described with respect to FIG. 4. For example, functions described with respect to the other flow diagrams and/or signal diagrams described herein may be combined with the functions described with respect to the flow diagram 400.

IV. Example Techniques for Predictive Caching

Some embodiments, when processing a read operation to read a document from the object-based storage 190, advantageously retrieve one or more additional documents from the object-based storage 190 to reduce transactions with the object-based storage 190 and to enable quicker processing of a subsequent read operation related to the one or more additional documents. As with some of the techniques discussed above, this is particularly advantageous for companies that pay a fee per transaction with the object-based storage 190.

Figure 5:
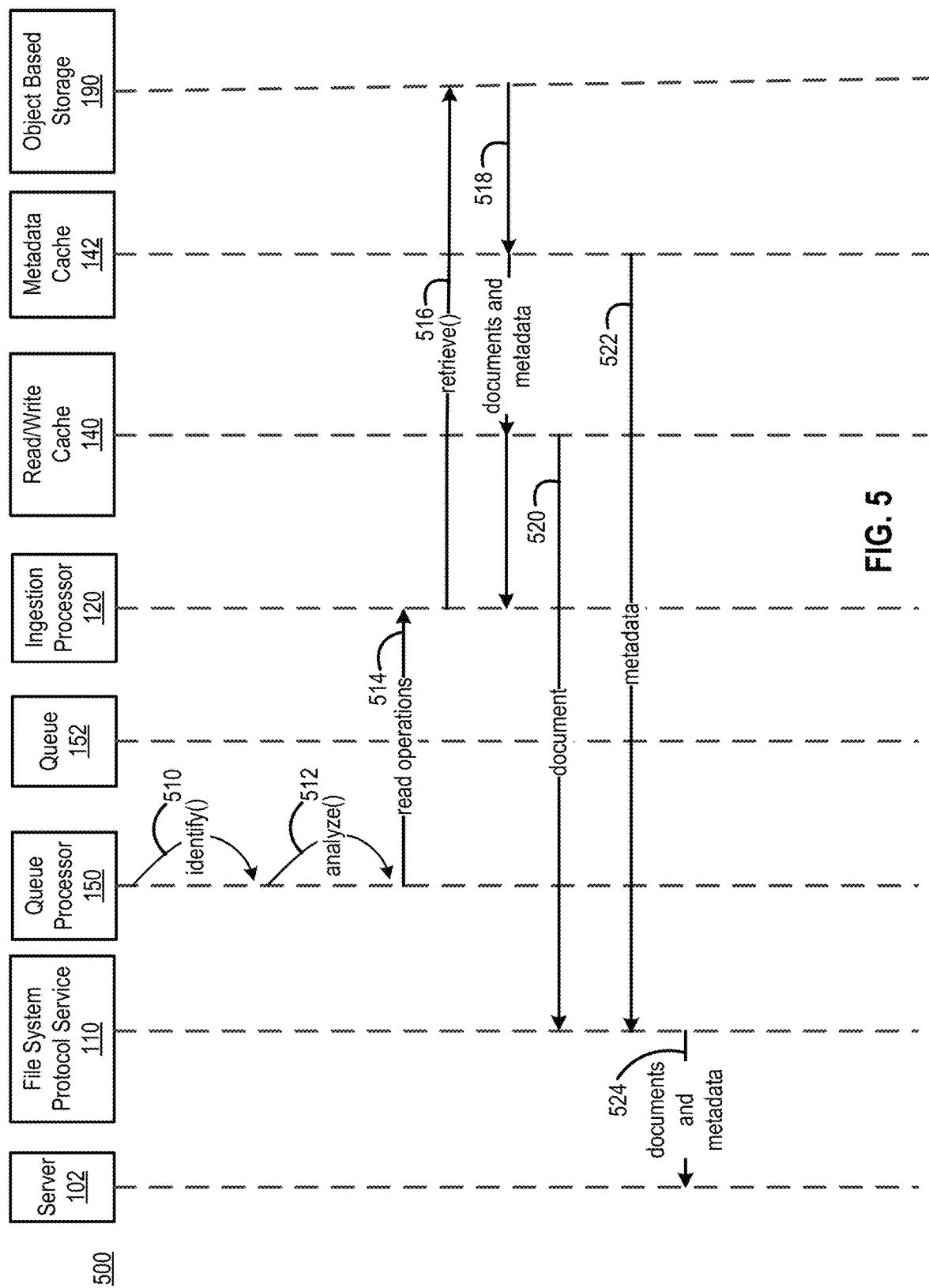
FIG. 5 illustrates an example signal diagram for predictive caching to reduce queue processing time, according to an embodiment.

FIG. 5 illustrates an example signal diagram 500 for analyzing a queue to reduce transaction count via predictive caching, according to an embodiment. More particularly, the signal diagram 500 illustrates the signals exchanged and/or detected by various components of an object-based data storage environment, such as the environment 100 of the example of FIG. 1.

The signal diagram 500 begins when the queue processor 150 identifies (510) a read operation in the queue 152 to read a document from the object-based data storage 190. For example, the queue processor 150 may determine that the operation at the front of the queue 152 is a read operation. As another example, the queue processor 150 may identify the read operation located closest to the front of the queue 152. As yet another example, the queue processor 150 may be configured to periodically analyze the queue 152 to identify read operations. Accordingly, the identified read operation may be at any position in the queue 152.

The queue processor 150 then analyzes (512) the identified read operation to identify an additional document to read from the object-based data storage 190. In some embodiments, the additional document is not associated with a read operation in the queue of operations 152. In some implementations, the identification of the additional document to read from the object-based data storage 190 includes identifying that the document and the additional document are related, for example, by being included in a same file path.

In some embodiments, the analysis (512) of the read operation identified in the queue 152 includes analyzing the read operation relating to the corresponding document with a machine learning algorithm to identify the one or more additional documents. Any suitable machine learning algorithm may be used. For example, a deep learning algorithm, a neural network, a random forest, etc. may be used. Furthermore, the additional document may be identified based upon a distance to the document in a vector space defined by the machine learning algorithm. In this example, the documents maintained at the object-based storage 190 may relate to an e-Discovery project where the vector space is generated using support vector machines (SVM) or other feature-extraction techniques to generate a vector space indicative of whether or not a document is relevant to the e-Discovery task. The additional document may be located in a cluster of documents that includes the document identified in the read operation or is otherwise located in the vector space proximate to document identified in the read operation. In some embodiments, the clustering and/or distance calculations may occur after reducing the vector space down to two dimensions.

The machine learning algorithm may be trained on any suitable data. For instance, the machine learning algorithm may be trained based on data of a plurality of documents maintained at the object-based data storage 190 (e.g., type of document, read/write history of the document, etc.). However, additionally or alternatively, other data may be used as well. For example, data of a customer of a company of the server 102 may be used. For example, some customers may have a tendency to read more documents from the object-based storage 190 than others, and thus the machine learning algorithm may be trained based on the customer's specific information as well. Thus, in one example, a neural network is first trained from data of a plurality of documents maintained that the object-based storage 190. Subsequently, the trained neural network may be used in the analysis (512) to identify the one or more additional documents (e.g., by a distance to the one or more additional documents in vector space).

In another example, the machine learning algorithm may be trained to assign classifiers to documents maintained in the object-based storage 190. For example, the classifiers may relate to relevance, privilege, legal entities, topics, and/or other information conveyed by the document. These classifiers may be maintained as part of the document's metadata. Subsequently, the queue processor 150 may identify one or more classifiers associated with the document identified in the read operation to identify additional documents with the same or a subset of the classifiers. In some embodiments, if a threshold number of additional documents share the same classifiers, the queue processor 150 may identify the closest documents within a vector space defined by a machine learning algorithm, as described above.

Additionally or alternatively, the read operation may be one of many read operations in the queue 152. In this regard, the queue processor 150 may analyze any number of read operations in the queue 152 to identify the additional document. In some embodiments, the queue processor 150 identifies the one or more read operations based on the requestor. For example, the queue processor 150 may aggregate documents identified by read operations only if they are from the same requestor.

For instance, the queue processor 150 may compare values in the metadata field (e.g., author, sender, date, source, etc.) of the read operation of the document with values from the metadata fields of documents of other read operations in the queue 152. If value(s) match (or are substantially similar within a tolerance), the queue processor 152 may identify a document with the matching value(s) as the additional document. As another example, if the queue processor 150 detects read operations in the queue 152 for documents within the same file path, the queue processor 150 may identify additional documents that share the file path. That is, if a particular directory includes five documents and the queue 152 includes a read command for three of the five documents, the queue processor 150 may identify the remaining two documents in the directory as the additional documents.

In some embodiments, the amount of available storage in the caches 140, 142 may change the number of additional documents the queue processor 150 will identify during the analysis (512). For example, if more of the memory is being used in the read/write cache 140, the queue processor 150 may identify fewer documents via the analysis (512). For example, the queue processor 150 may require additional metadata fields and/or classifiers to match or change the distance threshold in the vector space to be a smaller value. On the other hand, if less of the memory in the read/write cache 140 is being used, the queue processor 150 may identify more documents via the analysis (512). For example the queue processor 150 may require fewer metadata fields and/or classifiers to match or change the distance threshold in the vector space to be a larger value. In these embodiments, thresholds (e.g., watermarks) for memory usage levels may be used to identify the memory usage levels at which the queue processor 150 identifies a different number of documents via the aforementioned techniques.

In addition, a total quantity of the additional documents may be controlled. For example, the quantity of additional documents that can be predictively loaded into the caches 140, 142 may be limited to a predetermined number (e.g., 10 documents, 100 documents, etc.) across all read operations analyzed via the analysis (512). Accordingly, the threshold similarity required during the analysis (512) may vary depending on the age of the documents previously predictively loaded into the caches 140, 142 using the disclosed techniques. To this end, the longer a predictively loaded documents remains in the caches 140, 142, the less likely the queue processor may be to detect a corresponding read operation in the queue 152 for the document. Accordingly, the queue processor 150 may vary the number of documents identified via the analysis (512) based on metric that analyzes the age of documents previously predictively cached and/or the relative similarity between a current candidate additional document and the current read command(s) as compared to a similarity between the prior loaded document and its corresponding document(s) identified by read commands.

The queue processor 150 then creates a read operation for the additional document(s) identified by the analysis (512), and sends (514) the read operation of the document and the newly created read operation(s) of the additional document(s) to the ingestion processor 120. Alternatively to (514), the queue processor 150 may send the read operations to the file system protocol service 110 where they may be translated into an appropriate object-based operation as discussed above; and in turn, the file system protocol service 110 may then send the read operations to the ingestion processor 120.

In response, the ingestion processor 120 may then retrieve (516) the document and the additional document(s) from the object-based storage 190. For instance, the ingestion processor 120 may generate and send a transaction to retrieve the document and the additional document(s) to the object-based storage 190. However, in some embodiments, prior to generating the transaction that is sent to the object-based storage 190, the ingestion processor 120 processes the read operations to determine whether any of the documents and/or metadata are already stored in the caches 140, 142 (e.g., in response to a prior predictive loading process). If so, the documents and metadata may be retrieved from the caches 140, 142 without sending instructions to the object-based storage 190.

In response, the object-based storage 190 may retrieve the documents indicated in the transaction (or fragments thereof) and send (518) the document, additional document, and corresponding metadata back to the ingestion processor 120 for storage in the caches 140, 142. For documents that have been sliced, the ingestion processor 120 may receive different slices of the document in different tranches from the object-based storage 190. Accordingly, the ingestion processor 120 may also receive information indicating that all of a document's (or document fragment's) slices have been retrieved from the object-based storage 190.

The ingestion processor 120 may then obtain the documents from the read/write cache 140 and any corresponding metadata from the metadata cache 142 to send (520, 522) the documents and the corresponding metadata to the file system protocol service 110. In some embodiments, the object-based storage protocol does not support metadata. Accordingly, the ingestion processor 120 may be configured to merge the document and the corresponding metadata file into a single document before sending to the file system protocol service 110. The file system protocol service 110 then sends (524) the documents and/or metadata to the requestor of the read operation, which, in the illustrated example, is the server 102. In other embodiments, the ingestion processor 120 merges the document and metadata and routes the merged document to the requestor without using the file system protocol service as an intermediary.

Moreover, now that the additional document and metadata have been predictively loaded into the caches 140, 142, advantageously, the queue processor 150 may subsequently detect that a read operation associated with one of the additional document was added to the queue 152. For example, in response to receiving a read operation from the queue processor 150 and/or the file system protocol service 110, the ingestion processor 120 may analyze the cache 140 to determine whether the indicated document has been previously loaded in the cache 140, for example, in response to being identified via the analysis (512). The ingestion processor 120 may provide the indicated document and corresponding metadata from the caches 140, 142 to the requestor (e.g., the server 102) without sending an additional retrieve transaction to the object-based data storage 190.

As described elsewhere herein, in some embodiments, the metadata of the document is maintained as part of the document itself. That is, instead of creating a separate metadata file for storage at the metadata cache 142, the ingestion processor 120 may modify the document to include indications of the metadata. For example, the ingestion processor 120 may create a slice of the document dedicated to the metadata. Accordingly, in these embodiments, when processing a write operation, storing the metadata to the metadata cache 142 envisions the ingestion processor 120 alternatively storing the metadata as part of the document itself in the cache 140. That is, in these embodiments, the metadata cache 142 is the same cache as the read/write cache 140. Similarly, in these embodiments, when processing a read operation, the ingestion processor 120 obtaining the metadata from the metadata cache 142 envisions the ingestion processor 120 alternatively obtaining the metadata from the modified document.

Furthermore, the example signal diagram 500 should be viewed as illustrative, and not restrictive. For example, not all of the events must happen specifically as illustrated in the example signal diagram 500. For instance, the ingestion processor 120 may perform any of the functions of the queue processor 150 illustrated in the example of FIG. 5, and vice versa. For example, the ingestion processor 120, rather than the queue processor 150, may analyze the queue 152 to identify the additional document. Moreover, many of the events illustrated in the signal diagram 500 may be performed by components other than those illustrated performing the events.

In addition, although not illustrated in FIG. 5, the queue processor 150 and/or file system protocol service 110 may record events indicative of the actions described with respect to signal diagram 500 to the message bus 180 as they happen. For instance, the file system protocol service 110 may record an event to the message bus 180 indicating that the document and additional documents were provided to the requestor. In this regard, the components of the VM 104 create a record of events which is easily accessible over the message bus 180.

Additionally, while the signal diagram 500 relates to predictively caching one or more documents in response to detecting a read operation, the techniques may be adapted to predictively cache documents in response to other operations related to documents maintained at the object-based storage 190. For example, in response to writing multiple documents to a particular directory, the queue processor 150 may predictively load a different document that was stored in the same directory. Moreover, the predictive caching techniques disclosed here can be scaled to adapt to the dynamic conditions of the queue 152 and/or the caches 140, 142 to ensure that the predictive caching does not adversely impact the primary operation of the caches 140, 142 as it relates to processing the operations in the queue 152.

Figure 6:
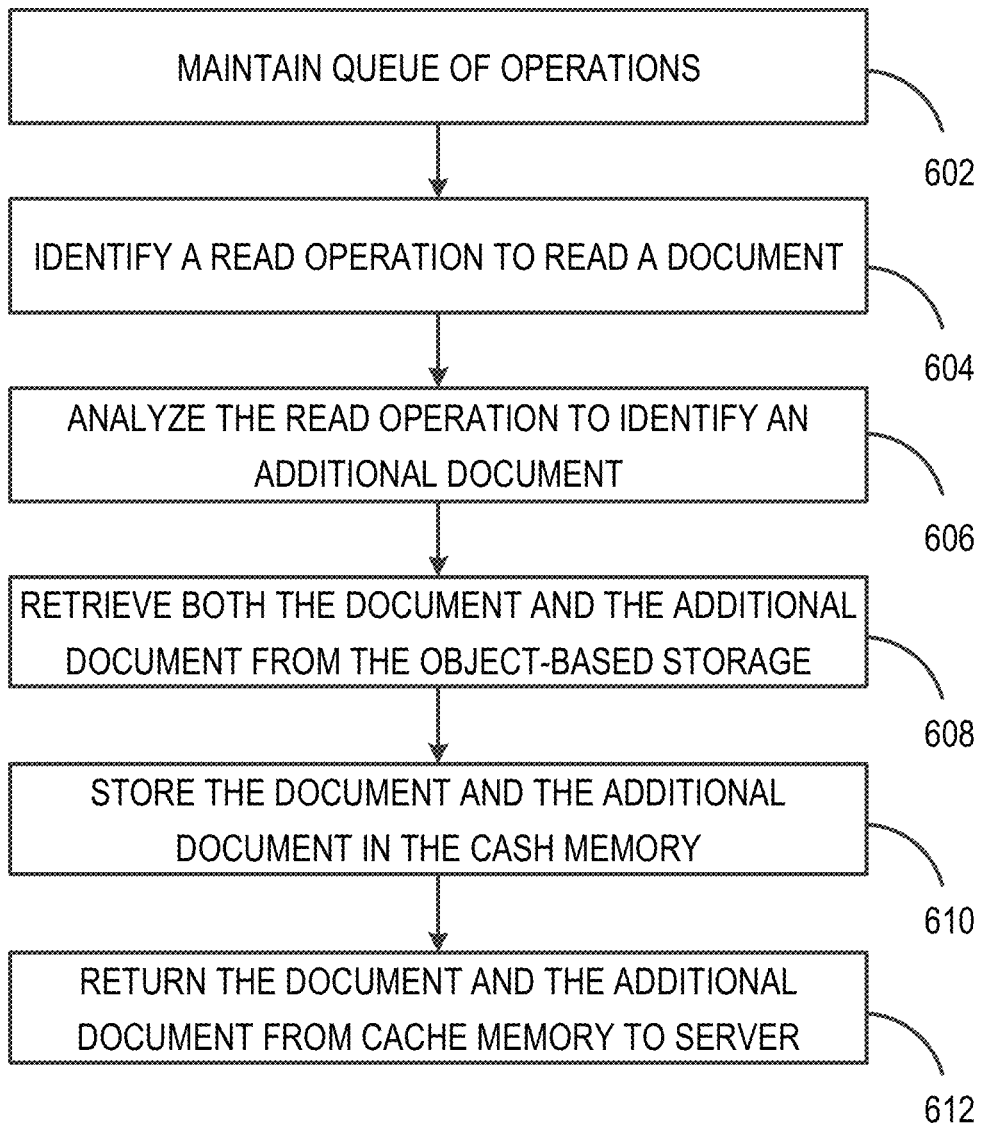
FIG. 6 depicts an example flow diagram of a method for predictive caching to reduce transaction count, according to an embodiment.

FIG. 6 depicts an example flow diagram 600 of a method for predictive caching, according to an embodiment. The method 600 may be performed by one or more processors that instantiate the VM 104. More particularly, the one or more processors may be the one or more processors that execute the instructions of the software module that corresponds to the queue processor 150 and/or the ingestion processor 120 instantiated at the VM 104.

The example flow diagram 600 may begin at block 602 by maintaining, with the one or more processors, the queue 152. For example, the one or more processors may add or remove operations from the queue 152. The operations may have been received from the server 102. Additionally or alternatively, the operations may have been received from a customer (not shown in FIG. 1) of a company of the servers 102. For instance, if a customer is providing documents to the server 102 for analysis, in some embodiments, the customer may send operations to the VM 104.

At block 604, the one or more processors identify, in the queue 152, a read operation to read a document from the object-based data storage 190. At block 606, the queue processor 150 analyses the identified read operation to identify an additional document to read from the object-based data storage 190. In some embodiments, the additional document is not associated with a read operation in the queue of operations 152. In some embodiments, the analyzing the read operation identified in the queue 152 comprises analyzing the read operation relating to the document with a machine learning algorithm trained by a plurality of documents maintained at the object-based data storage 190. In some variations, the additional document is identified based upon a distance to the document in a vector space defined by the machine learning algorithm.

In some implementations, the identifying the additional document to read from the object-based data storage 190 to the cache memory 142 comprises identifying that the document and the additional document are included in a same file path. Additionally or alternatively, the document is associated with a label and the additional document is associated with the same label.

In some embodiments, the read operation comprises a plurality of read operations in the queue. Accordingly; the one or more processors may analyze the plurality of read operations to identify the additional document.

At block 608, the one or more processors retrieves both the document and the additional document from the object-based data storage 190. In some embodiments, documents maintained at the object-based storage 190 are sliced into individual slices, and each individual slice of the individual slices has a memory size of less than a predetermined individual slice memory size. At block 610, the document, and additional document are stored in the read/write cache 140; and the corresponding metadata is stored in the metadata cache 142.

At block 612, the one or more processors provides the document and the corresponding metadata to the server 102. Furthermore, the one or more processors may analyze the queue 152 to detect a read operation in the queue of operations 152 associated with the additional document. In response, the one or more processors sends (along with or separately from the document) the additional document, and corresponding metadata to the server 102 without sending an additional retrieve transaction to the object-based data storage 190. Thus, the number of transactions with the object-based storage 190 is reduced.

It should be appreciated that other embodiments may include additional, fewer, or alternative functions to those described with respect to FIG. 6. For example, functions described with respect to the other flow diagrams and/or signal diagrams described herein may be combined with the functions described with respect to the flow diagram 600.

V. Example Techniques for Locking Objects for Efficient Cache Management

Some embodiments relate to object (e.g., documents, document fragments, metadata files, etc.) locking and/or deletion in the read/write cache 140 and/or the metadata cache 142. By way of brief overview, in some embodiments, the ingestion processor 120, or a data reaper 130 instantiated by the ingestion processor 120, deletes documents and/or metadata from the caches 140, 142. However, objects and/or metadata in the caches 140, 142 may be set to reader locked, writer locked, or unlocked states; and, only objects in the unlocked state may be deleted from the caches 140, 142.

Figure 7A:
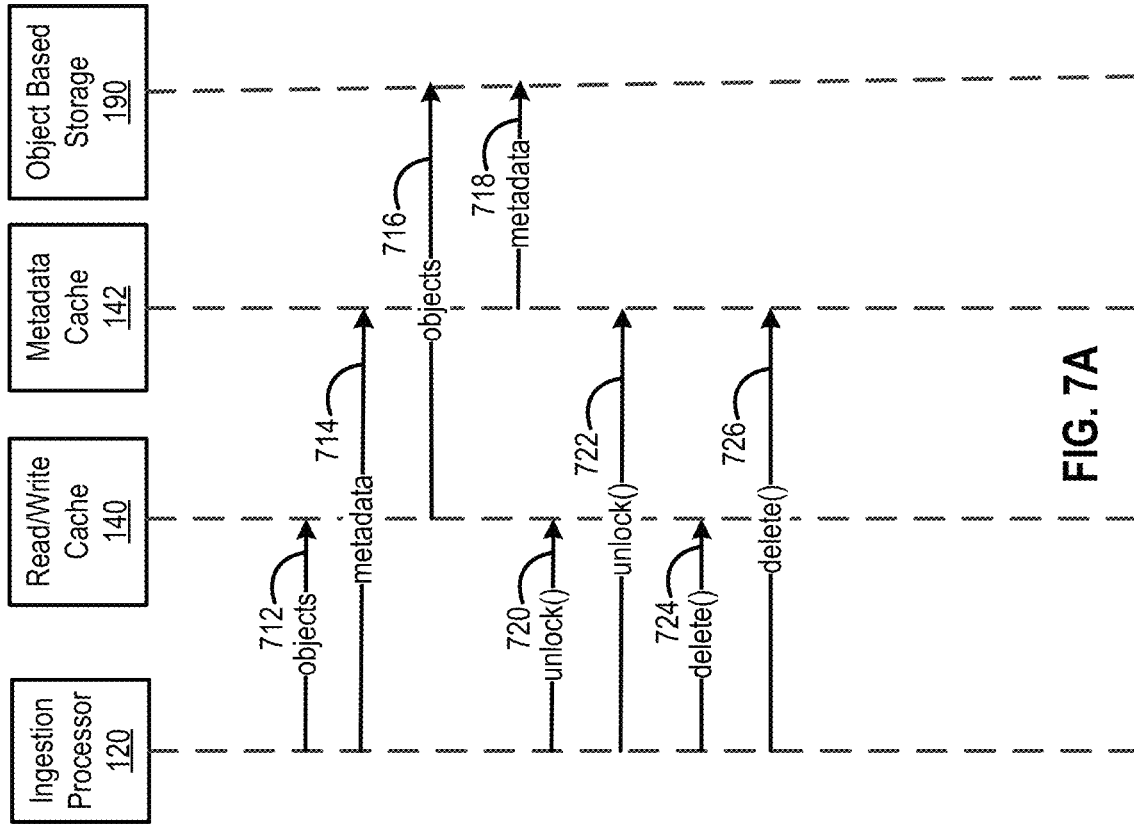
FIG. 7A illustrates an example signal diagram for locking objects, including an example of writing an object to an object-based storage, according to an embodiment.

FIG. 7A illustrates an example signal diagram 700 for object-based document storage, including an example of writing a document to the object-based document storage 190. More particularly, the signal diagram 700 illustrates the signals exchanged and/or detected by various components of an object-based data storage environment, such as the environment 100 of the example of FIG. 1.

The signal diagram 700 begins when the ingestion processor stores (712) the objects in the read/write cache 140, and stores (714) the corresponding object metadata in the metadata cache 142. For example, the ingestion processor 120 may have received a write operation from the queue processor 150 and/or the file system protocol service 110. In response, the ingestion processor 120 may store both the documents and the metadata in the caches 140, 142. As described above, in some embodiments, objects stored in the read/write cache 140 and/or metadata files stored in the metadata cache 142 may be associated with a flag indicative of a lock state. Accordingly, after storing the document and the corresponding metadata in the caches 140, 142 in response to a write operation, the ingestion processor 120 may set the lock state flag to a writer locked state. As described elsewhere herein, the ingestion processor 120 may slice the object into smaller slices and store the slices in the cache 140. Accordingly, the ingestion processor 120 may set the lock state flag for each slice individually.

To this end, in some embodiments, the lock state of each slice of a object is not changed in the until the entire object (e.g., each slice of the document and/or document fragment) is suitable to have the lock state changed. For instance, each slice of a object being written from the cache 140 to the object-based storage 190 may not have the lock state changed to unlocked until each slice of the object was written to the object-based storage 190. In this way, if part of the object becomes corrupted while moving the object to or from the cache 140, the slices of the object will remain in the cache 140 to enable additional attempts to write the object to the object-based storage 190.

After storing the objects and/or slices thereof in the cache 140, the ingestion processor 120 may generate one or more transactions to transfer the object (and/or slices thereof) to the object-based storage 190. Thus, the ingestion processor 120 will write (716) the objects associated with the write operations from the read/write cache 140 to the object-based storage 190, and write (718) the metadata files associated with the objects from the metadata cache 142 to the object-based storage 190. After the object and/or each slice of the document has been successfully stored at the object-based storage 190, the ingestion processor 120 may set the lock state of the objects successfully written to the object-based storage 190 to the unlocked state (720, 722).

As described above, the ingestion processor 120 is configured to instantiate one or more data reapers 130 that are configured to analyze the caches 140, 142 to delete (724, 726) objects therefrom. It should be appreciated that while the signal diagram 700 depicts steps (724, 726) as occurring after the processing of the write operation, the data reaper(s) 130 may constantly be deleting objects from the caches 140, 142.

In this regard, in some embodiments, the data reaper 130 may exclude objects that are in a locked state (or only identify objects that are in an unlocked state) when identifying objects for deletion in the caches 140, 142. As a result, objects are only deleted form the caches 140, 142 after they have been written to the object-based storage 190.

In some embodiments, the data reaper(s) 130 are configured to delete objects from the caches 140, 142 at a target rate. To accomplish this target rate, an autoscaler function may be used. For example, to increase the rate at which objects are deleted, the autoscaler may instantiate additional data reapers 130 until the actual deletion rate approximates the target rate. To this end, the autoscaler techniques may be implemented as a control loop, with a time period (e.g., 15 seconds) controlled by the ingestion processor 120. For example, during each time period of the control loop, the ingestion processor 120 may determine if it is necessary to increase or decrease the number of data reapers 130 and/or workers. In addition, the number of data reapers 130 and/or workers set by the ingestion processor 120 may be dependent not only on the target rate(s), but also on CPU utilization, and any other suitable factors. Additionally or alternatively, the instantiated data reaper(s) 130 may instantiate workers (e.g., pods, jobs, replicas, etc.) to delete the objects to achieve a target deletion rate.

In this respect, the ingestion processor 120 may set the target rate at which to delete the documents and/or metadata (e.g., in bits per second, documents deleted per time period, etc.). In some embodiments, the target rates are based on a threshold amount of data in the read/write cache 140 and/or metadata cache 142. Any number of thresholds and/or target rates may be used. For example, the threshold may be a memory-based threshold, an object count-based threshold, an inode-based threshold, or threshold based on other metrics related to cache usage. In some embodiments, if either the threshold for the read/write cache 140 is exceeded or the threshold for the metadata cache 142 is exceeded, the ingestion processor 120 may increase the target rate. Alternatively, the ingestion processor 120 may have separate thresholds for the read/write cache 140 and the metadata cache 142. That is, the ingestion processor 120 may only increase the target rate for the read/write cache 140 if the threshold for the read/write cache 140 is exceeded and only increase the target rate for the metadata cache 142 if the separate threshold for the metadata cache 142 is exceeded.

Additionally or alternatively to the above-described processes for data deletion, the ingestion processor 120, and/or the cache manager 128 may regulate memory sizes of the caches 140, 142. The amount of memory may be regulated as a cumulative amount of memory between the caches 140, 142, or separately for each cache 140, 142. In one example, the read/write cache 140 is allowed to store 1.5 terabytes of data, and the metadata cache memory 142 is allowed to store approximately 40 million inodes. However, if needed, the ingestion processor 120 (and/or cache manager 128 thereof) may increase the memory size of the caches 140, 142. For example, if the servers 102 upload a large volume of documents in a short time period such that the documents may not be able to written to the object-based storage 190 in a timely fashion, the ingestion processor 120 may increase the amount of memory in the caches 140, 142 (e.g., to 5 terabytes, 10 terabytes, 100 million inodes, etc.).

In some embodiments, it is possible for the ingestion processor 120 to readily increase or decrease the memory sizes of the caches 140, 142 because they are part of the VM 104, or part of hardware that the VM 104 is running on. In other words, in some embodiments, the ingestion processor 120 simply increases or decreases the memory size of the caches 140, 142 by allocating more or less memory to them from the VM 104 or hardware that the VM 104 is running on. In other embodiments, the VM 104 enlists additional physical resources to the cloud environment in which the VM 104 is instantiated.

However, as described above, in some embodiments, only objects in an unlocked state may be deleted, thereby preventing the deletion of objects which it still may be useful to keep in the cache memories 140, 142, such as those objects still being synchronized between the cache 140 and the object-based storage 190. To this end, some embodiments provide additional ways of locking or unlocking objects. For example, if the ingestion processor 120 receives instructions to modify a document, the ingestion processor 120 may set the lock state of the document to be writer locked. This situation may occur, for instance, if a document in the cache 140 is written to the object-based storage 190 (and thus then set in the unlocked state) but a modify operation is received prior to the document's deletion from the cache 140. In another example, if the ingestion processor 120 receives instructions to modify a file path of an object, the ingestion processor 120 may set the lock state of the object to writer locked.

Moreover, advantageously, directories (at least as far as they are maintained by an unattached directory of the file system protocol service 110) of documents may also have associated lock states. In this regard, a parent directory of a document may be placed in a lock state when, for example, instructions to modify the document or a file path of the document are received.

Objects in the unlocked state may be deleted from the read/write cache 140 and/or the metadata cache 142 by the data reaper(s) 130 in a random order, by file size, based on time of unlocking, or any other suitable order. In some embodiments, when the data reaper(s) 130 are configured to randomly delete objects from the caches 140, 142, the data reaper(s) 130 may exclude from selection any unlocked objects that are referenced by a transaction included in the queue 152. This prevents the data reaper(s) 130 from deleting objects from the caches 140, 142 that would otherwise need to be re-read from the object-based storage 190.

As this should make clear, advantageously, placing the document (or a parent directory of the document) in the locked state, and thereby preventing deletion, increases efficiency in usage of the cache resources (e.g., storage space) without impacting objects that are still being processed.

Figure 7B:
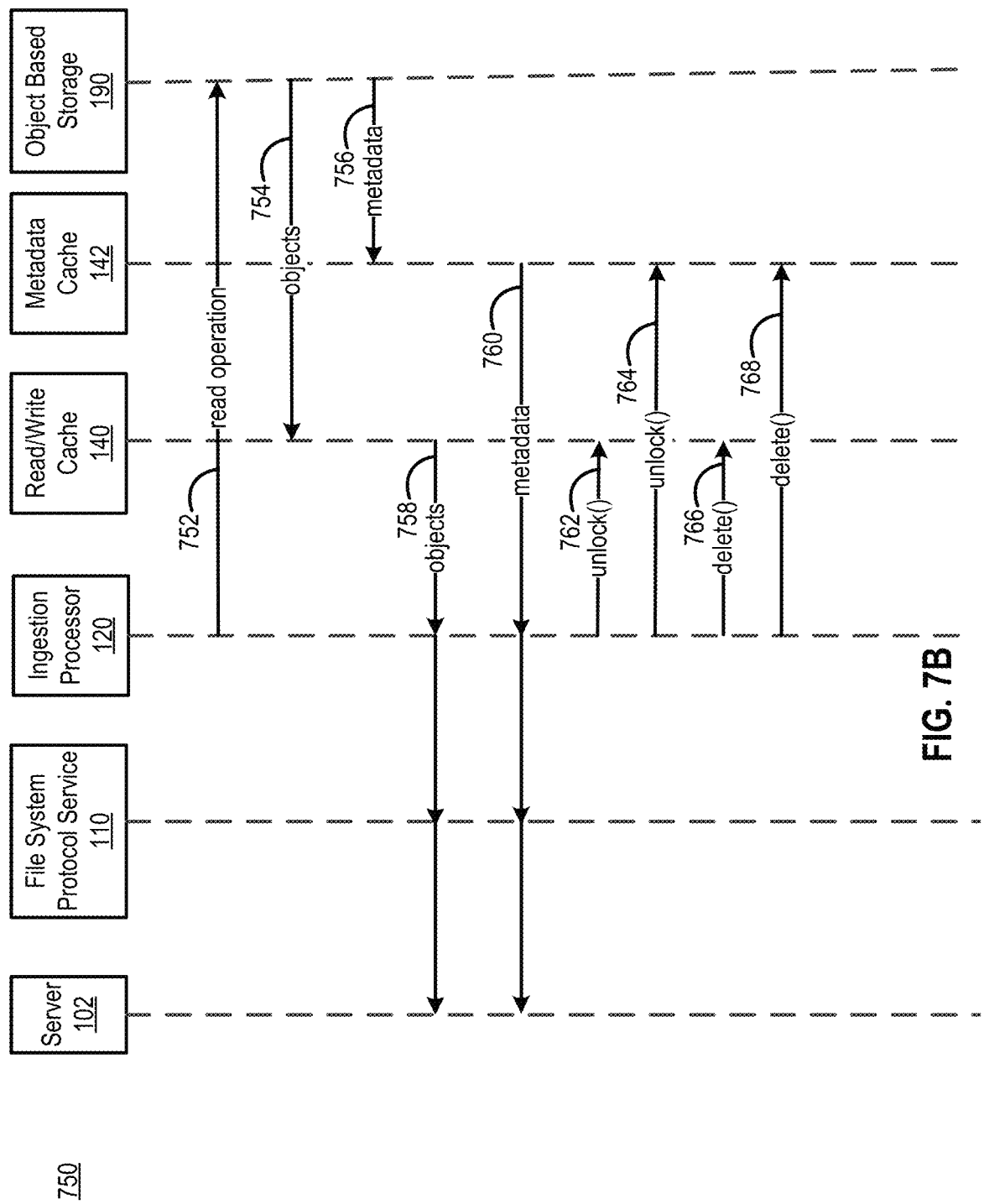
FIG. 7B illustrates an example signal diagram for locking objects, including an example of retrieving an object from an object-based storage, according to an embodiment.

FIG. 7B illustrates an example signal diagram 750 for object-based document storage, including an example of retrieving an object from the object-based document storage 190. More particularly, the signal diagram 750 illustrates the signals exchanged and/or detected by various components of an object-based data storage environment, such as the environment 100 of the example of FIG. 1. In some embodiments, the signal diagram 750 may be performed subsequent to the example signal diagram 700 of FIG. 7A. However, it should be understood that the events of the signal diagrams 700 and 750 may be performed in any order, and not all of the events must happen.

The signal diagram 750 begins when the ingestion processor 120 sends a transaction indicating one or more read operations (752) to the object-based storage 190. For example, the ingestion processor 120 may have received a read operation from the queue processor 150 and/or the file system protocol service 110 at step 514 of the signal diagram 500. In addition, although the following discussion will refer to an object, it should be understood that the following discussion may be applied to any number of read operations related to any number of objects.

In response to receiving the transaction, the object-based storage 190 retrieves the indicated objects and sends (754, 756) the indicated objects and, in embodiments where the metadata is maintained separate from the object, any corresponding metadata to the ingestion processor 120. The ingestion processor 120 (and/or the data sync 124 thereof) then stores the object in the read/write cache 140 and, in some embodiments, the metadata in the metadata cache 142. When the ingestion processor 120 stores the objects to the caches 140, 142, the ingestion processor 120 may set the lock state of the objects to a reader locked state.

The ingestion processor 120 then provides (758, 760) the requested objects to the requestor (in the illustrated example, the server 102). In some embodiments, the ingestion processor 120 sends the object to the file system protocol service 110 which, in turn, provides the document to the requestor. As part of providing the document to the requestor, the ingestion processor 120 may merge the metadata back into the object. In some embodiments, the ingestion processor 120 obtains the corresponding metadata file from the metadata cache 142. In other embodiments, the ingestion processor 120 extracts the metadata from the object (and/or the metadata slice thereof). Regardless, the ingestion processor 120 incorporates the indications included in the obtained metadata into the actual metadata fields of the object.

Further, it may be noted that although the example signal diagram 750 illustrates the server 102 as the requestor of the document, any other component (illustrated or not illustrated in the example of FIGS. 7A and 7B) may be the requestor. For example, a customer of a company of the server 102 may have its own separate server(s), which may be the requestor of documents from the object-based storage 190.

After providing the object to the requestor, the ingestion processor 120 may then set (762, 764) the locked state of the objects that has been provided to the requestor to the unlocked state. Accordingly, when the ingestion processor 120 deletes (766, 768) objects in the unlocked state from the read/write cache 140 and the metadata cache 142, the unlocked objects are able to be selected for deletion. The deletions may occur according to the techniques described above (e.g., with respect to steps 724, 726 of the signal diagram 700), or according to any other suitable techniques.

Furthermore, the example signal diagrams 700 and 750 should be viewed as illustrative, and not restrictive. For example, not all of the events must happen specifically as illustrated in the example signal diagrams 700 and 750. For example, many of the events illustrated in the signal diagram 700, 750 may be performed by components other than those illustrated performing the events.

In addition, although not illustrated in FIGS. 7A and 7B, the ingestion processor 120 may record events to the message bus 180 as they happen. For instance, the ingestion processor 120 may record an event to the message bus 180 when the document and additional documents are provided to the requestor. In this regard, ingestion processor 120 creates a record of events which is easily accessible over the message bus 180.

Figure 8:
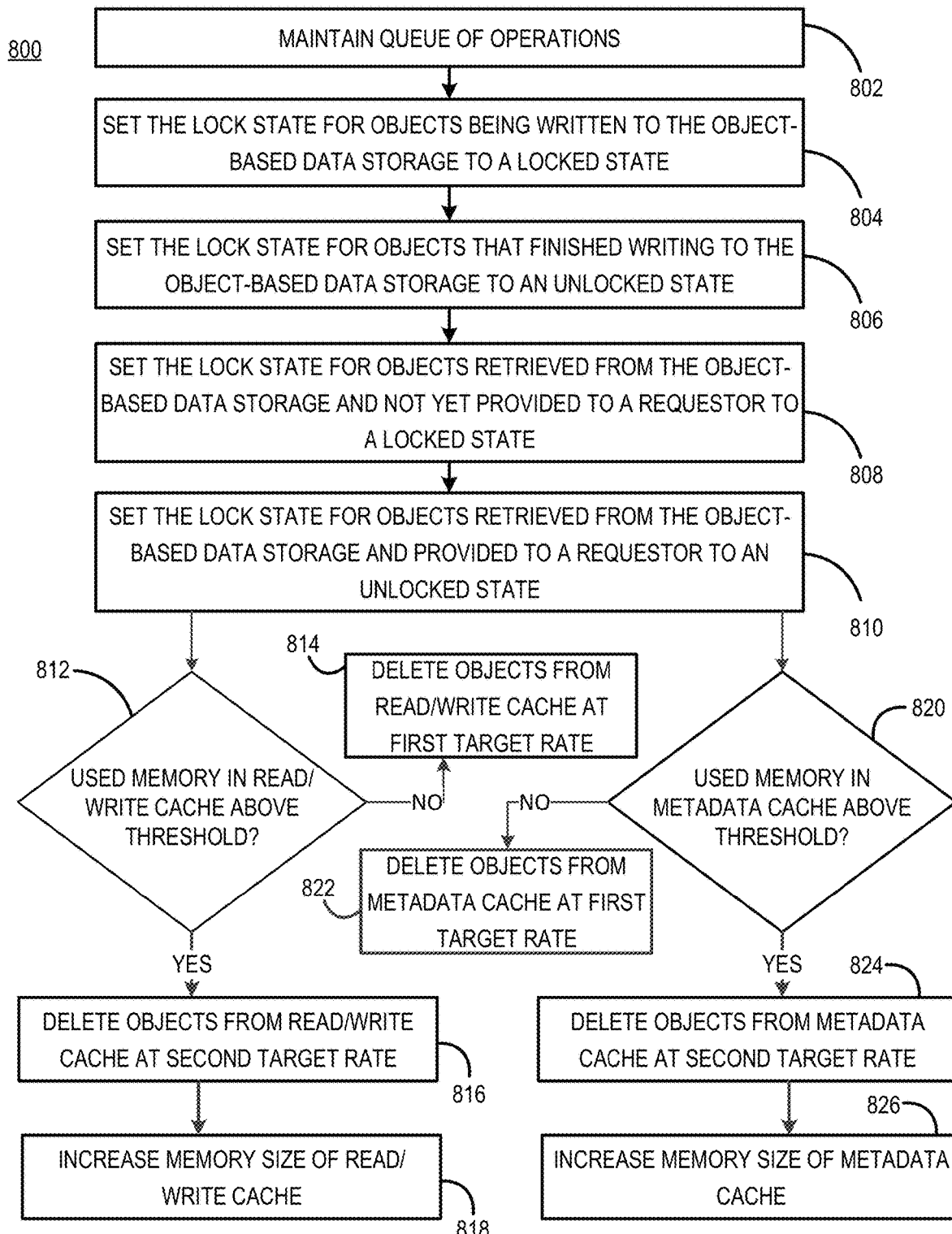
FIG. 8 depicts an example flow diagram of a method for locking objects, according to an embodiment.

FIG. 8 depicts an example flow diagram 800 of a method for predictive caching, according to an embodiment. The method 800 may be performed by one or more processors that instantiate the VM 104. More particularly, the one or more processors may by the one or more processors that execute the instructions of the software module that corresponds to the queue processor 150 and/or the ingestion processor 120 of the VM 104.

The example flow diagram 800 may begin at block 802 by maintaining, with the one or more processors, the queue 152. For example, the one or more processors may add or remove operations from the queue 152. The operations may have been received from the server 102. Additionally or alternatively, the operations may have been received from a customer (not shown in FIG. 1) of a company of the servers 102. For instance, if a customer is providing documents to the server 102 for analysis, in some embodiments, the customer may send operations to the VM 104.

Then, at block 804, the ingestion processor 120 sets the lock state for objects (e.g., documents, document fragments, metadata files, and/or slices thereof) being written to the object-based data storage 190 to a locked state, thereby preventing these documents from being deleted by any deletion process initiated by the ingestion processor 120. If the object is associated with a read operation, the locked state may be a reader locked state that prevents other processes from writing to the object (in addition to preventing the object's deletion). If the object is associated with a write operation, the locked state may be a writer locked state that prevents other processes from writing to or reading from the object (in addition to preventing the object's deletion). In some embodiments, there is also a metadata cache 142 configured to store metadata corresponding to the objects stored in the read/write cache 140, wherein objects in the metadata cache are associated with a lock state (e.g., the lock state of the corresponding objects being written to the object-based data storage 190). In some embodiments, the ingestion processor 120 is further configured to: when metadata corresponding to an object is deleted from the metadata cache 142, delete the corresponding object from the read/write cache 140. In some embodiments, the ingestion processor 120 is further configured to: when an object is deleted from the read/write cache 140, delete metadata corresponding to the object from the metadata cache 142.

At block 806, the ingestion processor 120 sets the lock state for objects that finished writing to the object-based data storage 190 to an unlocked state. Accordingly, these objects will now be able to be deleted by deletion processes initiated by the ingestion processor 120.

At block 808, the ingestion processor 120 sets the lock state for objects retrieved from the object-based data storage 190 and not yet provided to a requestor (e.g., the server 102) to a reader locked state. As a result, these objects will be excluded from the deletion processes initiated by the ingestion processor 120.

At block 810, the ingestion processor 120 sets the lock state for objects retrieved from the object-based data storage 190 and provided to a requestor (e.g., the server 102) to an unlocked state. Accordingly, these objects will now be able to be deleted by deletion processes initiated by the ingestion processor 120.

As another example, the ingestion processor 120 is further configured to set the lock state of the object to the locked state in response to receiving instructions to modify an object. Similarly, the one or more processors may be configured to set lock state of the object to the locked state in response to receiving instructions to modify a file path of an object (i.e., moving the object). As yet another example, the one or more processors may set a lock state of a parent directory of the object to a locked state in response to receiving instructions to modify an object, or a file path of the object.

At block 812, the ingestion processor 120 determines if an amount of used memory in the read/write cache 140 is below a read/write cache memory threshold. If not, the ingestion processor 120 deletes objects from the read/write cache 140 according to a first target rate (e.g., a slower target rate because less of the memory is being used) (block 814). In some embodiments, the ingestion processor 120 is further configured to delete the objects that are in the unlocked state in a random order. When randomly deleting objects having the unlocked state, the ingestion processor 120 may exclude from selection any objects referenced by a transaction in the queue 152.

If the amount of used memory in the read/write cache 140 is above the read/write cache memory threshold, the ingestion processor 120 deletes objects from the read/write cache 140 according to a second target rate (e.g., a faster target rate because more of the memory is being used) (block 816). To this end, in some embodiments, to delete objects in the read/write cache 140, the ingestion processor is configured to instantiate a data reaper process based on the first target rate. In some embodiments, to delete objects in the read/write cache at the second target rate, the ingestion processor 120 is configured to scale the data reaper process to the second target rate. In some embodiments, the first and second target rates are measured in one of: bits per second, or objects deleted per time period.

In addition, at block 818, the ingestion processor 120 may temporarily increase a memory size of the read/write cache 140. As such, in some embodiments, the ingestion processor 120 is further configured to: increase a memory size of the read/write cache 140 if either: (i) the amount of used memory in the read/write cache 140 is above the read/write cache memory threshold, or (ii) the amount of used memory in the metadata cache 142 is above a metadata cache memory threshold.

The ingestion processor 120 also determines if an amount of used memory in the metadata cache 142 is below a metadata cache memory threshold (block 820). If not, the ingestion processor 120 deletes metadata from the metadata cache 142 according to the first target rate (e.g., a slower target rate because less of the memory is being used) (block 822).

If the amount of used memory in the metadata cache 142 is above the metadata cache memory threshold, the ingestion processor 120 deletes objects from the metadata cache 142 according to the second target rate (e.g., a faster target rate because more of the memory is being used) (block 824). To this end, in some embodiments, the ingestion processor 120 is further configured to: delete, from the metadata cache 142, and according to the first target rate, the metadata corresponding to objects in an unlocked state if an amount of used memory in the metadata cache 142 is below metadata cache memory threshold; and delete, from the metadata cache 142, and according to the second target rate, the metadata corresponding to the objects in an unlocked state if an amount of used memory in the metadata cache 142 is above the metadata cache memory threshold. In addition, at block 826, the ingestion processor 120 may temporarily increase a memory size of the metadata cache 142. As such, in some embodiments, the ingestion processor 120 is further configured to: increase a memory size of the metadata cache 142 if either: (i) the amount of used memory in the read/write cache 140 is above the read/write cache memory threshold, or (ii) the amount of used memory in the metadata cache 142 is above a metadata cache memory threshold.

It should be appreciated that other embodiments may include additional, fewer, or alternative functions to those described with respect to FIG. 8. For example, functions described with respect to the other flow diagrams and/or signal diagrams described herein may be combined with the functions described with respect to the flow diagram 800.

VI. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for practicing the techniques disclosed herein through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

VII. Exemplary Aspects—Locking Documents

Aspect 1. A computer system for object-based data storage, the system comprising:

one or more queue processors configured to maintain a queue that stores a plurality of operations that interact with objects maintained at an object-based data storage;

a read/write cache configured to cache (i) objects to be written to the object-based data storage, and (ii) objects that are read from the object-based data storage for provision to a requestor, wherein objects in the read/write cache are associated with a lock state; and one or more ingestion processors configured communicative coupled with the one or more queue processors and the read/write cache, and configured to:
set the lock state for objects being written to the object-based data storage to a locked state;
set the lock state for objects that finished writing to the object-based data storage to an unlocked state;
set the lock state for objects retrieved from the object-based data storage and not yet provided to a requestor to a locked state;
set the lock state for objects retrieved from the object-based data storage and provided to a requestor to an unlocked state;
delete, from the read/write cache, and according to a first target rate, the objects in the unlocked state if an amount of used memory in the read/write cache is below a read/write cache memory threshold or inode threshold; and
delete, from the read/write cache, and according to a second target rate, the objects in the unlocked state if an amount of used memory in the read/write cache is above the read/write cache memory threshold or inode threshold;
wherein the second target rate is greater than the first target rate.

Aspect 2. The computer system of aspect 1, further comprising:
a metadata cache configured to store metadata corresponding to the objects stored in the read/write cache, wherein objects in the metadata cache are associated with a lock state.

Aspect 3. The computer system of any one of aspects 1-2, wherein the one or more ingestion processors are further configured to:
delete, from the metadata cache, and according to the first target rate, the metadata corresponding to objects in an unlocked state if an amount of used memory in the metadata cache is below metadata cache memory threshold; and
delete, from the metadata cache, and according to the second target rate, the metadata corresponding to the objects in an unlocked state if an amount of used memory in the metadata cache is above the metadata cache memory threshold.

Aspect 4. The computer system of any one of aspects 1-3, wherein the one or more ingestion processors are further configured to:
when metadata corresponding to an object is deleted from the metadata cache, delete the corresponding object from the read/write cache.

Aspect 5. The computer system of any of any one of aspects 1-4, wherein the one or more ingestion processors are further configured to:
when an object is deleted from the read/write cache, delete metadata corresponding to the deleted object from the metadata cache.

Aspect 6. The computer system of any one of aspects 1-5, wherein the one or more ingestion processors are further configured to:
increase a memory size of the read/write cache if either: (i) the amount of used memory in the read/write cache is above the read/write cache memory threshold, or (ii) the amount of used memory in the metadata cache is above a metadata cache memory threshold.

Aspect 7. The computer system of any one of aspects 1-6, wherein the one or more ingestion processors are further configured to:
increase a memory size of the metadata cache if either: (i) the amount of used memory in the read/write cache is above the read/write cache memory threshold, or (ii) the amount of used memory in the metadata cache is above a metadata cache memory threshold.

Aspect 8. The computer system of any one of aspects 1-7, wherein to delete objects in the read/write cache, the one or more ingestion processors are configured to instantiate a data reaper process based on the first target rate.

Aspect 9. The computer system of aspect 8, wherein to delete objects in the read/write cache at the second target rate, the one or more ingestion processors are configured to scale the data reaper process to the second target rate.

Aspect 10. The computer system of any one of aspects 1-9, wherein the one or more ingestion processors are further configured to:
in response to receiving instructions to modify an object, set lock state of the object to the locked state.

Aspect 11. The computer system of any one of aspects 1-10, wherein the one or more ingestion processors are further configured to:
in response to receiving instructions to modify a file path of an object, set lock state of the object to the locked state.

Aspect 12. The computer system of any one of aspects 1-11, wherein the one or more ingestion processors are further configured to:
in response to receiving instructions to modify an object, or a file path of the object, set a lock state of a parent directory of the object to a locked state.

Aspect 13. The computer system of any one of aspects 1-12, wherein the first and second target rates are measured in one of: bits per second, or objects deleted per time period.

Aspect 14. The computer system of any one of aspects 1-13, wherein the one or more ingestion processors are further configured to delete the objects that are in the unlocked state in a random order.

Aspect 15. A computer-implemented method for object-based data storage, comprising:
maintaining, with one or more queue processors, a queue of operations relating to a plurality of objects maintained at an object-based data storage;
setting, with one or more ingestion processors, the lock state for objects being written to the object-based data storage to a locked state;
setting, with the one or more ingestion processors, the lock state for objects that finished writing to the object-based data storage to an unlocked state;
setting, with the one or more ingestion processors, the lock state for objects retrieved from the object-based data storage and not yet provided to a requestor to a locked state;
setting, with the one or more ingestion processors, the lock state for objects retrieved from the object-based data storage and provided to a requestor to an unlocked state;
deleting, with the one or more ingestion processors, from the read/write cache, and according to a first target rate, the objects in the unlocked state in response to an amount of used memory in the read/write cache being below a read/write cache memory threshold or inode threshold; and
deleting, with the one or more ingestion processors, from the read/write cache, and according to a second target rate, the objects in the unlocked state in response to an amount of used memory in the read/write cache being above the read/write cache memory threshold or inode threshold;

wherein the second target rate is greater than the first target rate.

Aspect 16. The computer-implemented method of aspect 15, further comprising, with the one or more ingestion processors:

storing, in a metadata cache, metadata corresponding to the objects stored in the read/write cache, wherein objects in the metadata cache are associated with a lock state.

Aspect 17. The computer-implemented method of any one of aspects 15-16, wherein:

the setting of the lock state for objects being written to the object-based data storage comprises setting the lock state to a writer lock state;

the one or more ingestion processors prevent objects in the writer lock state from both: (i) being written to the object-based storage, and (ii) being retrieved from the object-based storage;

the setting the lock state for objects retrieved from the object-based data storage and not yet provided to a requestor to a locked state comprises setting the lock state to a reader lock state; and the one or more ingestion processors: (i) prevent objects in the reader lock state from being written to the object-based data storage, and (ii) allow objects in the reader lock state to be read by other processes.

Aspect 18. A computer system for object-based data storage, the system comprising:

a queue processor configured to maintain a queue that stores a plurality of operations that interact with objects maintained at an object-based data storage;

a read/write cache configured to cache (i) objects to be written to the object-based data storage, and (ii) objects that are read from the object-based data storage for provision to a requestor, wherein objects in the read/write cache are associated with a lock state; and a non-transitory computer readable medium storing processor-executable instructions that, when executed by an ingestion processor, cause the ingestion processor to:

set the lock state for objects being written to the object-based data storage to a locked state;

set the lock state for objects that finished writing to the object-based data storage to an unlocked state;

set the lock state for objects retrieved from the object-based data storage and not yet provided to a requestor to a locked state;

set the lock state for objects retrieved from the object-based data storage and provided to a requestor to an unlocked state;

delete, from the read/write cache, and according to a first target rate, the objects in the unlocked state if an amount of used memory in the read/write cache is below a read/write cache memory threshold or inode threshold; and delete, from the read/write cache, and according to a second target rate, the objects in the unlocked state if an amount of used memory in the read/write cache is above the read/write cache memory threshold or inode threshold;

wherein the second target rate is greater than the first target rate.

Aspect 19. The computer system of aspect 18, wherein the setting of the lock state for objects that finished writing to the object-based data storage to an unlocked state comprises:

determining that an object has finished writing to the object-based storage by determining that each slice of the object has finished writing to the object-based storage.

Aspect 20. The computer system of any one of aspects 18-19, wherein the instructions, when executed by the ingestion processor, further the cause the ingestion processor to delete the objects that are in the unlocked state in a random order by:

excluding, from selection for random order deletion, objects in the unlocked state that are referenced by an operation included in the queue.

What is claimed:

1. A computer system for object-based data storage, the system comprising:

one or more queue processors configured to maintain a queue that stores a plurality of operations that interact with objects maintained at an object-based data storage;

a read/write cache configured to cache (i) objects to be written to the object-based data storage, and (ii) objects that are read from the object-based data storage for provision to a requestor, wherein objects in the read/write cache are associated with a lock state; and one or more ingestion processors configured communicative coupled with the one or more queue processors and the read/write cache, and configured to:

delete, from the read/write cache, and according to a first target rate, objects in an unlocked state if an amount of used memory in the read/write cache is below a read/write cache memory threshold or inode threshold; and delete, from the read/write cache, and according to a second target rate, the objects in the unlocked state if the amount of used memory in the read/write cache is above the read/write cache memory threshold or inode threshold;

wherein the second target rate is greater than the first target rate.

2. The computer system of claim 1, further comprising:

a metadata cache configured to store metadata corresponding to the objects stored in the read/write cache, wherein objects in the metadata cache are associated with a lock state.

3. The computer system of claim 2, wherein the one or more ingestion processors are further configured to:

delete, from the metadata cache, and according to the first target rate, the metadata corresponding to objects in an unlocked state if an amount of used memory in the metadata cache is below metadata cache memory threshold; and delete, from the metadata cache, and according to the second target rate, the metadata corresponding to the objects in an unlocked state if the amount of used memory in the metadata cache is above the metadata cache memory threshold.

4. The computer system of claim 3, wherein the one or more ingestion processors are further configured to:

when metadata corresponding to an object is deleted from the metadata cache, delete the corresponding object from the read/write cache.

5. The computer system of claim 2, wherein the one or more ingestion processors are further configured to:
when an object is deleted from the read/write cache, delete metadata corresponding to the deleted object from the metadata cache.

6. The computer system of claim 2, wherein the one or more ingestion processors are further configured to:
increase a memory size of the read/write cache if either: (i) the amount of used memory in the read/write cache is above the read/write cache memory threshold, or (ii) the amount of used memory in the metadata cache is above a metadata cache memory threshold.

7. The computer system of claim 2, wherein the one or more ingestion processors are further configured to:
increase a memory size of the metadata cache if either: (i) the amount of used memory in the read/write cache is above the read/write cache memory threshold, or (ii) the amount of used memory in the metadata cache is above a metadata cache memory threshold.

8. The computer system of claim 1, wherein to delete objects in the read/write cache, the one or more ingestion processors are configured to instantiate a data reaper process based on the first target rate.

9. The computer system of claim 8, wherein to delete objects in the read/write cache at the second target rate, the one or more ingestion processors are configured to scale the data reaper process to the second target rate.

10. The computer system of claim 1, wherein the one or more ingestion processors are further configured to:
in response to receiving instructions to modify an object, set lock state of the object to the locked state.

11. The computer system of claim 1, wherein the one or more ingestion processors are further configured to:
in response to receiving instructions to modify a file path of an object, set lock state of the object to the locked state.

12. The computer system of claim 1, wherein the one or more ingestion processors are further configured to:
in response to receiving instructions to modify an object, or a file path of the object, set a lock state of a parent directory of the object to a locked state.

13. The computer system of claim 1, wherein the first and second target rates are measured in one of: bits per second, or objects deleted per time period.

14. The computer system of claim 1, wherein the one or more ingestion processors are further configured to delete the objects that are in the unlocked state in a random order.

15. A computer-implemented method for object-based data storage, comprising:
maintaining, with one or more queue processors, a queue of operations relating to a plurality of objects maintained at an object-based data storage;
deleting, with one or more ingestion processors, from a read/write cache, and according to a first target rate, objects in an unlocked state in response to an amount of used memory in the read/write cache being below a read/write cache memory threshold or inode threshold; and
deleting, with the one or more ingestion processors, from the read/write cache, and according to a second target rate, the objects in the unlocked state in response to the amount of used memory in the read/write cache being above the read/write cache memory threshold or inode threshold;
wherein the second target rate is greater than the first target rate.

16. The computer-implemented method of claim 15, further comprising, with the one or more ingestion processors:
storing, in a metadata cache, metadata corresponding to the objects stored in the read/write cache, wherein objects in the metadata cache are associated with a lock state.

17. The computer-implemented method of claim 15, wherein:
the method further comprises setting the lock state for objects being written to the object-based data storage comprising setting the lock state to a writer lock state;
the one or more ingestion processors prevent objects in the writer lock state from both: (i) being written to the object-based storage, and (ii) being retrieved from the object-based storage;
the method further comprises setting a lock state for objects retrieved from the object-based data storage and not yet provided to a requestor to a locked state comprising setting the lock state to a reader lock state; and
the one or more ingestion processors: (i) prevent objects in the reader lock state from being written to the object-based data storage, and (ii) allow objects in the reader lock state to be read by other processes.

18. A computer system for object-based data storage, the system comprising:
a queue processor configured to maintain a queue that stores a plurality of operations that interact with objects maintained at an object-based data storage;
a read/write cache configured to cache (i) objects to be written to the object-based data storage, and (ii) objects that are read from the object-based data storage for provision to a requestor, wherein objects in the read/write cache are associated with a lock state; and
a non-transitory computer readable medium storing processor-executable instructions that, when executed by an ingestion processor, cause the ingestion processor to:
delete, from the read/write cache, and according to a first target rate, objects in an unlocked state if an amount of used memory in the read/write cache is below a read/write cache memory threshold or inode threshold; and
delete, from the read/write cache, and according to a second target rate, the objects in the unlocked state if the amount of used memory in the read/write cache is above the read/write cache memory threshold or inode threshold;
wherein the second target rate is greater than the first target rate.

19. The computer system of claim 18, wherein the instructions, when executed by the ingestion processor, further the cause the ingestion processor to set the lock state for objects that finished writing to the object-based data storage to an unlocked state including:
determining that an object has finished writing to the object-based storage by determining that each slice of the object has finished writing to the object-based storage.

20. The computer system of claim 19, wherein the instructions, when executed by the ingestion processor, further the cause the ingestion processor to delete the objects that are in the unlocked state in a random order by:
excluding, from selection for random order deletion, objects in the unlocked state that are referenced by an operation included in the queue.

* * * * *